(12) United States Patent
van der Zwan et al.

(10) Patent No.: US 7,735,996 B2
(45) Date of Patent: Jun. 15, 2010

(54) CONNECTOR ASSEMBLY FOR CONNECTING AN EARPIECE OF A HEARING AID TO GLASSES TEMPLE

(75) Inventors: Jacob van der Zwan, Rotterdam (NL); Marcus Karel Sipkema, Arnhem (NL)

(73) Assignee: Varibel B.V., Meppel (NL)

( * ) Notice: Subject to any disclaimer, the term of this patent is extended or adjusted under 35 U.S.C. 154(b) by 961 days.

(21) Appl. No.: 10/585,113

(22) PCT Filed: May 23, 2006

(86) PCT No.: PCT/NL2006/050123

§ 371 (c)(1),
(2), (4) Date: Aug. 28, 2006

(87) PCT Pub. No.: WO2006/126881

PCT Pub. Date: Nov. 30, 2006

(65) Prior Publication Data

US 2009/0182688 A1 Jul. 16, 2009

(30) Foreign Application Priority Data

May 24, 2005 (EP) ................... 05104406
Apr. 4, 2006 (EP) ................... 06112196

(51) Int. Cl.
*G02C 1/00* (2006.01)
*H04R 25/00* (2006.01)
(52) U.S. Cl. .................. 351/158; 351/123; 381/381
(58) Field of Classification Search .............. 351/158, 351/123, 111, 41; 381/381, 380, 313, 74, 381/327, 312, 183, 187; 455/575.2
See application file for complete search history.

(56) References Cited

U.S. PATENT DOCUMENTS

| 3,119,903 | A | | 1/1964 | Rosemond et al. |
| 3,825,700 | A | * | 7/1974 | Jerry et al. ................ 381/327 |
| 3,856,007 | A | * | 12/1974 | Leight ...................... 128/866 |
| 4,379,988 | A | | 4/1983 | Mattatall et al. |
| 4,451,709 | A | | 5/1984 | Waxman et al. |
| 4,902,120 | A | * | 2/1990 | Weyer ...................... 351/158 |
| 5,159,639 | A | * | 10/1992 | Shannon et al. ............ 381/327 |
| 5,327,178 | A | | 7/1994 | McManigal et al. |
| 5,717,771 | A | | 2/1998 | Sauer et al. |
| 7,461,936 | B2 | * | 12/2008 | Jannard .................... 351/158 |
| 2002/0054689 | A1 | | 5/2002 | Zhang et al. |

(Continued)

FOREIGN PATENT DOCUMENTS

DE 26 25 654 12/1977

(Continued)

*Primary Examiner*—Hung X Dang
(74) *Attorney, Agent, or Firm*—Young & Thompson

(57) ABSTRACT

Connector assembly for connecting an earpiece (27) of a hearing aid to a glasses temple (13). The glasses temple (13) has hearing aid components. The connector assembly (31) has a first connector housing (34) and a second connector housing (37). The first connector housing (34) is designed to be attached to the earpiece (27) via an intermediate unit (29) whereas the second connector housing (37) is designed to be attached to the glasses temple (13). The first and second connector housings (34, 37) are designed to engage one another by way of a disconnectable connection.

23 Claims, 15 Drawing Sheets

U.S. PATENT DOCUMENTS

| | | |
|---|---|---|
| 2002/0090102 A1 | 7/2002 | Madaffari et al. |
| 2002/0131614 A1 | 9/2002 | Jakob et al. |
| 2003/0156725 A1 | 8/2003 | Boone et al. |
| 2004/0234090 A1 | 11/2004 | Berg |
| 2005/0074137 A1 | 4/2005 | Bailey |

FOREIGN PATENT DOCUMENTS

| | | |
|---|---|---|
| WO | WO 97/11574 | 3/1997 |

* cited by examiner

CONNECTOR ASSEMBLY FOR CONNECTING AN EARPIECE OF A HEARING AID TO GLASSES TEMPLE

FIELD OF THE INVENTION

The present invention relates to a connector assembly for connecting an earpiece of a hearing aid to a glasses temple.

PRIOR ART

Several types of hearing aid glasses have been proposed in the past, see e.g. EP-A-1025744, WO2004/028203, and prior art referred to in files relating to these documents. However, constructive design details as to how to manufacture one or more practical embodiments of such hearing aid glasses are not known from these prior art documents.

SUMMARY OF THE INVENTION

The present invention is directed to several constructive details of hearing aid glasses and supporting equipment therefore. Several aspects of the invention have wider application than just hearing aid glasses as will become evident from the detailed description hereinafter.

In a first aspect, the invention relates to a connector assembly used to attach hearing aid glasses to an earpiece. The hearing aid glasses comprise electronics for the hearing aid. Sound, either as an acoustic or as an electrical signal, has to be directed from the glasses to a human ear through the use of an intermediate unit, e.g. a tube or cable attached to the earpiece. Existing hearing aid glasses have the disadvantage that the earpieces are difficult to put into the ear, as a turning movement of the earpieces is required during insertion, while the earpieces are tightly attached to the glasses. The same problem exists when taking the earpieces out. However in this case an extra risk exists, which is that the user takes off his/her glasses first without thinking about the attached earpieces. In such a case, at best an unpleasant pulling sensation is felt in the ear(s), and at worst the connection between earpiece and glasses breaks.

The objective of this aspect of the invention is to use a connector assembly that provides both a magnetic connection and electrical connection that disconnects when the user puts off his/her glasses, and is easily connected by the user when he/she puts the glasses on.

To that end the invention provides a connector assembly as claimed in claim 1.

The advantages of this first aspect of the invention are that the insertion and extraction of the earpieces can now be done independently of putting off/on the glasses, as the glasses are not connected during insertion and extraction of the earpieces, and furthermore the risk of breakage of an intermediate unit in case of inadvertently putting off the glasses does not exist anymore.

In an embodiment at least one of the electrical contacts is designed to cover at least a portion of the magnetic component. Then, less space is required than in situations where the electrical contact is located remote from the magnetic component. Furthermore, since that electrical contact is contacting the magnetic component they are as close to one another as they can be, thus, improving the contact force required for the electrical contact.

In a second aspect, the invention is directed to a cradle set for charging a battery in a temple of glasses where the temples comprise electronic components that need power supply. Such glasses may be hearing aid glasses.

To that end, in its second aspect, the invention provides a cradle set comprising a transformer arranged to receive electrical power from a mains and transform said electrical power to battery charging power to charge a first chargeable battery and a cradle housing comprising at least a first opening, the first opening comprising a first electrical contact and a second electrical contact, the first opening being shaped to receive a rear side portion of a first glasses temple and the first and second electrical contacts being designed to contact electrical contacts on said rear side portion of said first glasses temple in order to provide said battery charging power to said first glasses temple.

Thus, a user of the hearing aid glasses can put off his/her glasses and insert the rear side portion of the glasses temple in the first opening and the battery in the glasses temple will be charged. This can be done overnight when the user is not wearing his/her glasses anyway.

Using rechargeable batteries in glasses with electronics has the advantage for the user of not needing to exchange batteries, which is the case when disposable batteries are used. Exchanging disposable batteries results in a substantial cost for the user, especially in the case of daily use. Moreover, exchanging small batteries is a difficult task, taking into account that the user is not wearing his/her glasses while exchanging. This is especially so in case the user is elderly, and has decreased motorial control (e.g., trembling fingers).

Rechargeable batteries however also have a disadvantage over disposable batteries in that they are substantial larger for the same power storage. The larger battery size could result in decreased attractiveness of the glasses. This aspect of the invention solves this issue in 2 ways:

1. In glasses with electronics with disposable batteries, for example hearing aid glasses, the power lifetime of a battery is between several days and several weeks. A battery power lifetime of less than several days is not deemed acceptable by users. As the glasses in this invention can be charged every night, the power lifetime of one charge operation of the battery only needs to be one day. This decreases the required size of the rechargeable battery to approximately the same size as a disposable battery in a comparable product.
2. The battery, being the largest electronics component in the glasses, is in this invention being placed at the rear end of the temple. On the head of a user this is the position behind the ear, which is the least visible place.

A further objective of the second aspect of this invention is that the cradle set can accommodate a wide range of glasses. Glasses measures (front widths, front heights, temple lengths, temple shapes) vary widely, because measures of people's heads vary and because glasses designs vary. Furthermore, temples also get bent around the ear and towards the head when the optician fits the glasses to the user's head, resulting in even more variations. And finally, glasses get deformed during use; temples and hinges are bent or deformed. Accommodating such a wide range of glasses variations with one cradle set is achieved in this aspect of the invention by using contact points at the rear ends of the temples. These can be seen as two points which can move substantially independently from each other when the temples are partially extended, because they can move up and down relative to each other (by turning the glasses around the main axis parallel to the extended temples), and towards and away from each other (by closing or fully extending the temples). Therefore these rear ends with contacts can always be positioned in the opening(s) of the cradle.

In a third aspect the invention relates to constructive details of a glasses temple comprising electronic components. Here, the objective is to better protect the electronic components from being damaged due to external influences, like bending of the glasses temple.

To that end, in the third aspect, the invention provides a glasses temple comprising a printed circuit board with electrical components, a temple housing and a metal plate, the temple housing accommodating both said printed circuit board and said metal plate, said metal plate being arranged to protect said printed circuit board with electrical components.

In a fourth aspect the invention relates to updating hearing aid programs of a processor arrangement in a hearing aid. Here, the objective is to provide a method, and means for performing such a method, to spread available updates of such hearing aid programs in an easy way, without requiring the hearing dispenser to actively take care of latest updates being available on his computer.

To that end, in the fourth aspect, the invention provides a method of updating a hearing aid, comprising:
a) providing a computer with a computer processor arranged to communicate with other telecommunication devices and storing a computer version of a hearing aid application program;
b) providing hearing aid glasses with a hearing aid processor arranged to communicate with other telecommunication devices and storing a hearing aid glasses version of said hearing aid application program;
c) setting up a communication between said computer processor and said hearing aid processor;
d) checking whether said hearing aid glasses version is a more recent version than said computer version of said hearing aid application program;
e) if said hearing aid glasses version is more recent than said computer version, transferring said hearing aid glasses version to said computer and to store said transferred hearing aid glasses version in said computer as an updated computer version;
f) if said computer version is more recent than said hearing aid glasses version, transferring said computer version to said hearing aid processor and to store said computer version in said hearing aid processor as updated hearing aid glasses version.

BRIEF DESCRIPTION OF THE DRAWINGS

The present invention will be explained in detail with reference to some drawings, which are only intended for illustrative purposes and not to limit the scope of the invention. The scope is defined by the annexed claims and its equivalents.

DESCRIPTION OF THE PREFERRED EMBODIMENT

The present invention comprises several aspects. They will be explained in detail below.

Charging Cradle/Battery Housing.

Figure 1:
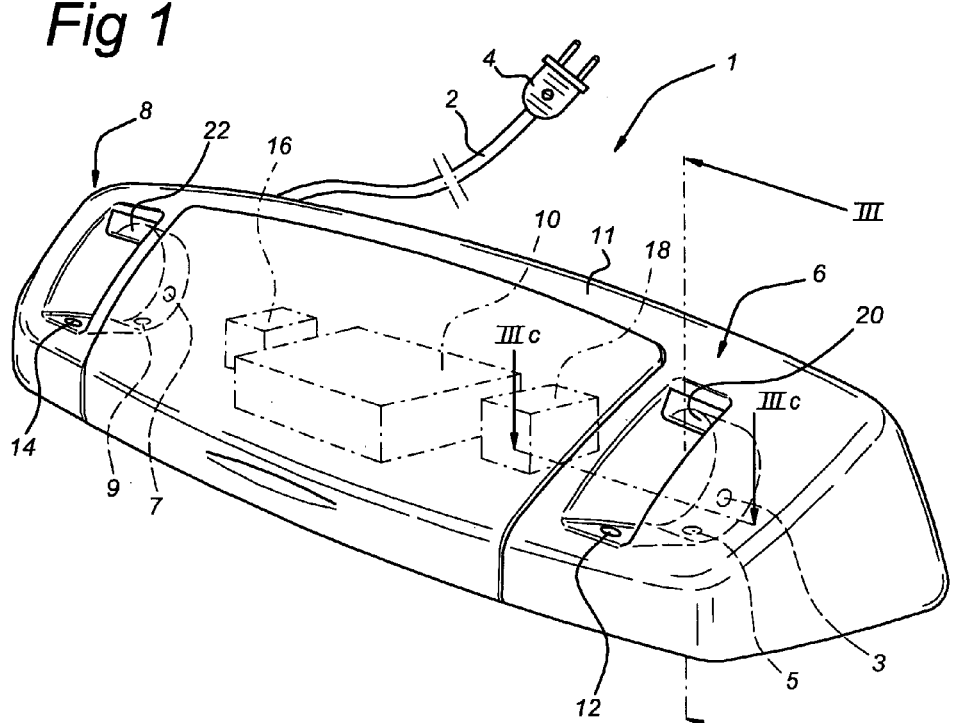
FIG. 1 shows a charging cradle.

FIG. 1 shows a charging cradle 1. The charging cradle 1 comprises a housing 11 preferably made of a suitable synthetic material. The charging cradle 1 comprises two openings 6, 8 each shaped to receive a rear side portion of a wide variety of glasses temples, as will be explained further below. Each of the openings 6, 8 comprises two distinct electrical contacts 3, 5, 7, 9. The electrical contacts 3, 5, 7, 9 are accommodated in pairs in two resilient clamps 20, 22. Each opening 6, 8 comprises one such resilient clamp 20, 22. The resilient clamps 20, 22 may be made of a suitable synthetic, electrically insulating material, as will become apparent from FIGS. 3a, 3b.

The housing 11 accommodates a transformer 10 to transform electrical power received from the mains to electrical power to charge a battery accommodated in glasses temples (cf. FIGS. 2 and 3). Such a battery is arranged to provide electrical power to electrical equipment in such glasses temples or in other parts of glasses associated with such glasses temples. The housing 11 is connected to one side of a cable 2 that is, at its other side, connected to a plug 4 designed to be connected to the mains. In an alternative embodiment, the transformer 10 is located outside the housing 11 and connected to the electrical contacts 3, 5, 7, 9 by suitable wiring.

The cradle 1 may comprise a processor 16 connected to the transformer 10 to receive electrical power and arranged to communicate, either wirelessly or via a cable, with external devices. It's possible use will be explained in more detail in the section "updating hearing aid software". To that end, the cradle 1 may, in addition to or instead of the processor 16, also comprise a transceiver 18 for communication with external devices, e.g., by means of Bluetooth. The transceiver 18 is also connected to the transformer 10 for receiving electrical power.

In an embodiment, the housing 11 comprise lights 12, 14 in, or close to, the openings 6, 8. They may be electrically connected to processor 16 such that processor 16 controls them to provide light when no temple of glasses is positioned in the opening 6, 8. Locating the lights 12, 14 in, or close to, the openings 6, 8 facilitates finding the openings 6, 8. This facilitates inserting the temples for a user, as he/she does not wear his/her glasses while inserting, and as it might be dark (the recharging may take place at night). Moreover, these lights 12, 14 may be controlled by the processor 16 to indicate other operation states like at least one of charging, charging complete and no-connection between temple contacts and electrical contacts 3, 5, 7, 9. The lights 12, 14 are preferably made of light emitting diodes (LED's). Different colors or different lighting patterns may be used to indicate different operation states.

Figure 2A:
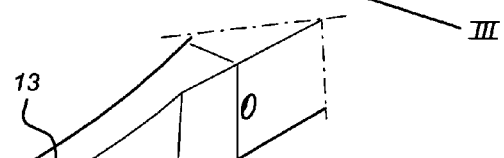
FIGS. 2a, 2b show a battery housing at a glasses temple.
Figure 2B:
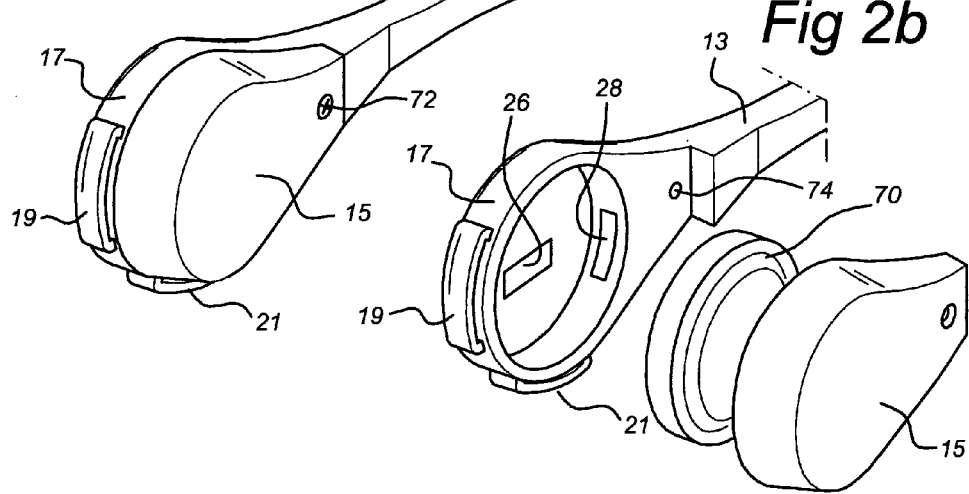

FIGS. 2a, 2b show an embodiment of a back portion of a glasses temple 13. FIG. 2 a shows the back portion in its assembled state whereas FIG. 2b shows the back portion with taken away cover member. As shown in FIG. 2a, the glasses temple 13 has a rear side portion 17 that is connected to a cover member 15. The cover member 15 can be removed from the rear side portion 17. The rear side portion 17 is provided with two electrical contacts 19, 21. Between the cover member 15 and the rear side portion 17, there is a hollow space for accommodating a battery 70 (see FIG. 2b) for providing electrical power to electrical components in the glasses temple 13 (or in other portions of the glasses). The electrical components may be part of a hearing aid. The electrical contacts 19, 21 are connected to respective contact pads 26, 28 within rear side portion 17, which are arranged to contact different electrical poles of battery 70. Two other contacts (not shown) connect the electrical poles of the battery to the electrical components. Preferably, the cover member 15 is located at an inside of the glasses temple 13, i.e. the side of the glasses temple 13 intended to face a head of a user of the glasses. This way, the cover members 15 are less visible when the user wears the glasses. Moreover, this is ergonomically better because a human head contour bends inwardly behind the ear and the glasses temple-inside thus follows the shape of the head. During fitting, at the optician, glasses are normally bent behind the ears towards the head, which with this design is not or less needed. The electrical contacts 19, 21 are preferably located at a rear side of the rear side portion 17. They may be provided on cover member 15 instead. FIG. 2a shows a screw (or bolt) 72 used to attach the cover member 15 to the rear side portion 17.

FIG. 2b shows the rear side portion 17 without the cover member 15. This figure shows that the rear side portion 17 has a space to accommodate a battery 70. It also shows the contact pads 26, 28. Moreover, it shows a hole 74 for receiving the screw 72.

Preferably, the rear sides of the cover 15 and the rear side portion 17 are circularly shaped such that the charging cradle 1 can accommodate a wide range of different glasses models. A circular shape facilitates electrical contact between respective electrical contacts 19, 21 and 3, 5 (7, 9). This is further explained with reference to FIGS. 3a, 3b.

Figure 2C:
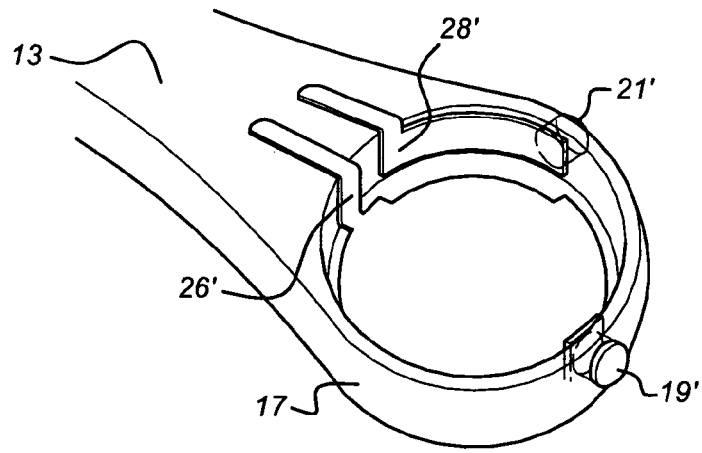
FIGS. 2c, 2d, 2e show an alternative battery housing at a glass temple.
Figure 2D:
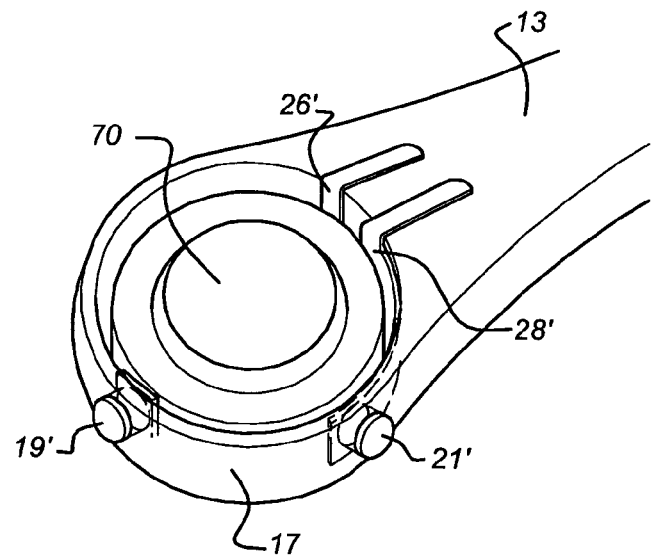
Figure 2E:
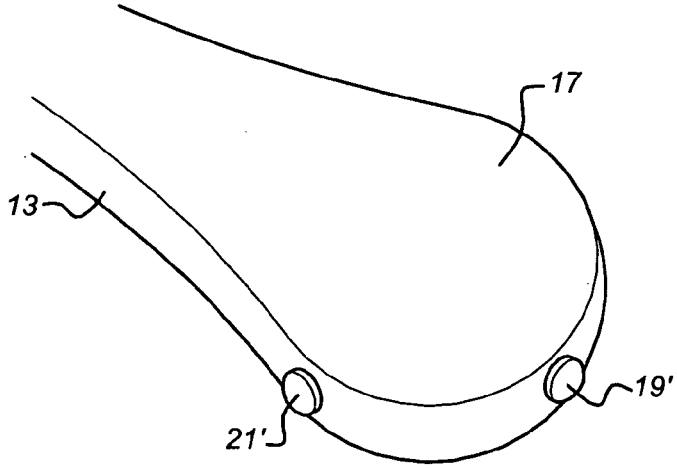

FIGS. 2c 2d, 2e show an alternative battery housing structure. The same components as in FIGS. 2a, 2b are indicated with the same reference numbers. Alternative components are indicated with a prime. So, the rear side portion 17 now comprises alternatively shaped contact pads 26', 28'. Contact pad 26' comprises a flat plate for contacting a flat side of battery 70, whereas contact pad 28' comprises an arc shaped portion to contact a circumference portion of battery 70.

Contact pad 26' is connected to an electrical contact 19' that is shaped as a bolt that connects to the contact pad 26' via a through hole through rear side portion 17.

Likewise, contact pad 28' is connected to an electrical contact 21' that is also shaped as a bolt that connects to the contact pad 28' via a through hole through rear side portion 17. The bolts can be positioned anywhere on the radius of the battery housing. By positioning them farther apart, the risk of short circuiting the contacts is diminished.

The bolt shaped electrical contacts 19', 21' need not have a slit or the like for a screw driver but may be designed to have any attractive appearance.

FIG. 2c shows the alternative embodiment with taken away cover member 15. FIG. 2d shows the alternative embodiment having a battery arranged within the battery housing. FIG. 2e shows the alternative embodiment with cover member 15 attached to the rear side portion 17.

Figure 3A:
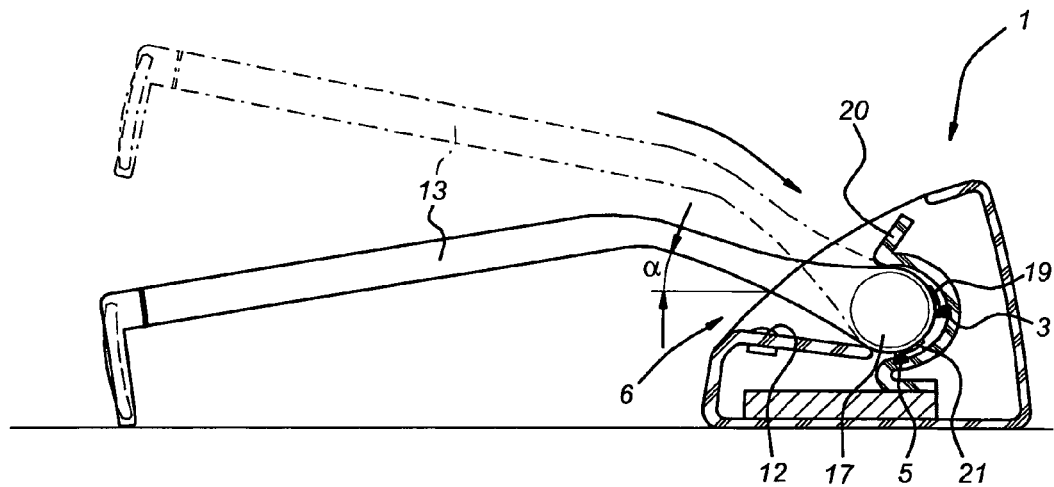
FIGS. 3a, 3b show a cross sectional view of a glasses temple placed in the charging cradle along line III-III in FIG. 1.
Figure 3B:
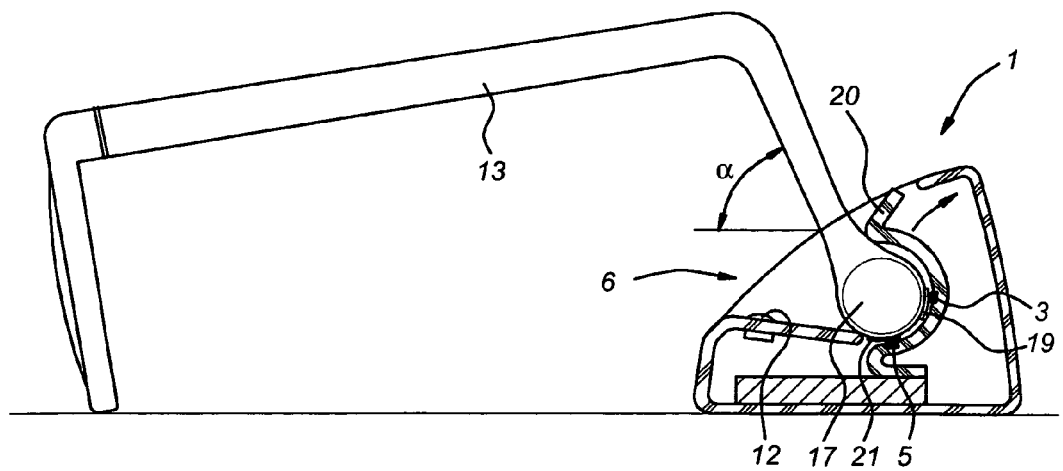

FIGS. 3a, 3b show two different examples of a glasses temple 13 placed in opening 6 of charging cradle 1. Same reference numbers refer to same components as in earlier figures. FIGS. 3a, 3b show the charging cradle 1 in cross section along a line III-III in FIG. 1. The clamp 20 (as well as the clamp 22) within opening 6 of charging cradle 1 is, preferably, shaped to receive and clamp a back portion of a glasses temple 13. In that clamping condition, the electrical contacts 3, 5 contact electrical contacts 19, 21, respectively. To that end, clamp 20 may be semi-circularly shaped and resilient, as shown. However, other mechanical designs may be used instead.

By making the electrical contacts 19, 21 rather long, these electrical contacts 19, 21 will contact the electrical contacts 3, 5 on the clamp 20 when the back portion of the glasses temple 13 is inserted into the clamp 20 under a wide variety of angles α. By designing clamp 20 and opening 6 in such a way, the charging cradle 1 is able to receive rear side portions 17 with cover members 15 under a wide range of angles α, as is shown in FIGS. 3a, 3b. The clamp 22 with its electrical contacts 7 and 9, respectively, is preferably similarly shaped as clamp 20 with its electrical contacts 3 and 5, respectively.

Preferably, cover members 15 and rear side portions 17 of a left and right glasses temple 13 are shaped in a mirror symmetry such that the cover members 15 only fit to one of rear side portions 17.

Figure 3C:
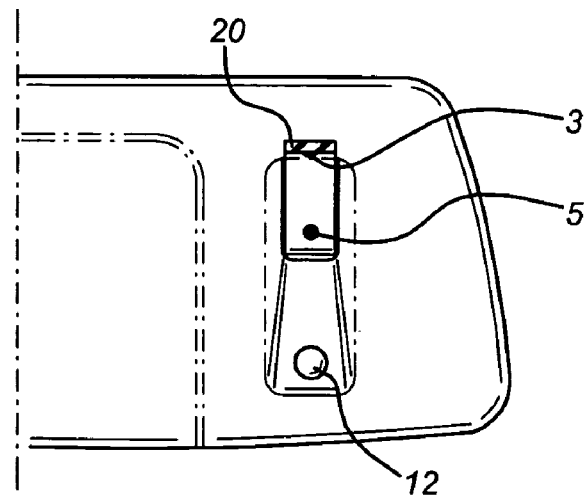
FIG. 3c shows a cross sectional view through the charging cradle along line IIIc-IIIc in FIG. 1.

Preferably, the opening 6, 8 of the charging cradle 1 have a width that becomes smaller the closer to the clamp 20, 22. FIG. 3c, which is a cross sectional view along line IIIc-IIIc in FIG. 1, shows this for opening 6. Such a tapered width supports easy insertion of temple 13 into opening 6.

Figure 3D:
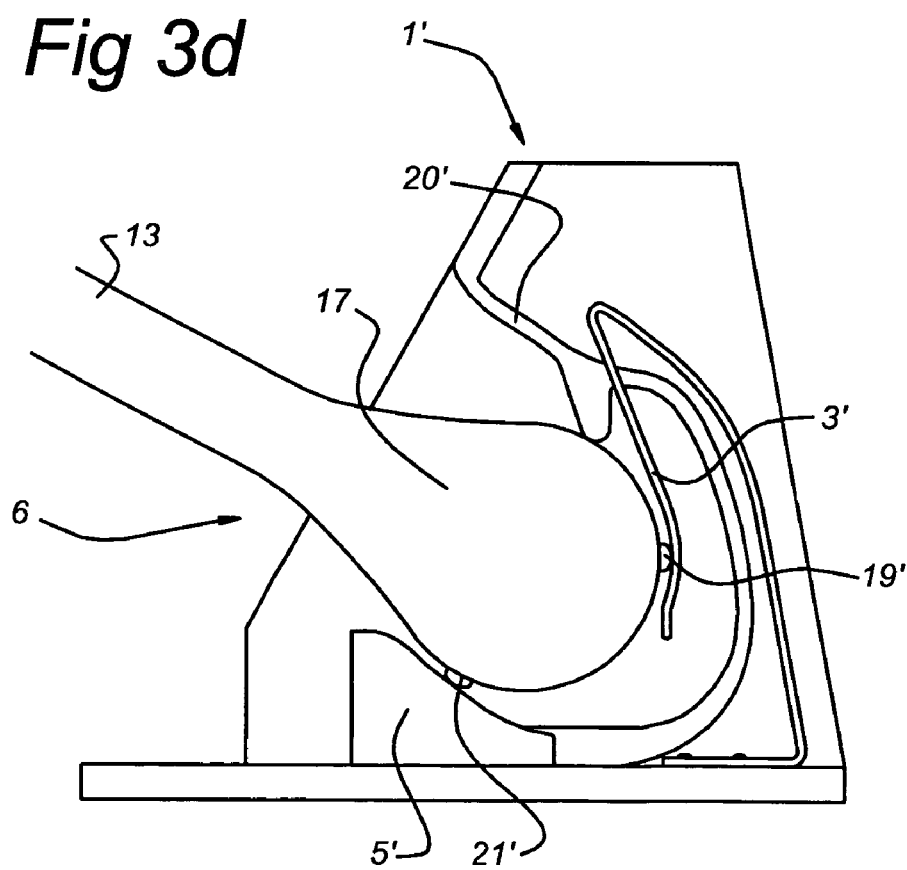
FIG. 3d shows a cross section view of an alternative charging cradle.

FIG. 3d shows a cross section view of an alternative charging cradle 1'. This alternative charging cradle is designed to cooperate with the alternative battery housing shown in FIGS. 2c, 2d, 2e. The same components as in FIGS. 3a-3c are indicated with the same reference numbers. Alternative components are indicated with a prime.

Since the electrical contacts 19', 21' of the alternative battery housing are shaped as heads of bolts their contact surface is rather small. Therefore, in the embodiment of FIG. 3d, there are provided alternative electrical contacts 3', 5' within the cradle 1' with a rather large contact surface to be sure that electrical contact is established when the rear side portion 17 of the temple 13 is moved into the cradle 1' taking into consideration that the angle under which the rear side portion 17 enters the cradle 1' varies from user to user, based on how far the rear side portion was bent to fit the person's head. The electrical contact 5' is shown to be a fixed member, whereas, electrical contact 3' is shown to be designed as a flexible member, e.g., as a portion of a flat spring.

Moreover, the cradle 1' comprises a clamp 20' designed to clamp the rear side portion 17.

The present invention also relates to an alternative cradle. This alternative cradle will be explained in detail after the sections relating to the "connector assembly" and the "temple" since it uses the connector as explained in these sections.

Connector Assembly.

In the case that the glasses with electronics comprise a hearing aid, sound, either as an acoustic or as an electrical signal, has to be directed from the glasses to a human ear through the use of an intermediate unit, e.g., a tube or cable attached to an earpiece. Existing hearing aid glasses have the disadvantage that the earpieces are difficult to put into the ear, as a turning movement of the earpieces is required during insertion, while the earpieces are tightly attached to the glasses. The same problem exists when taking the earpieces out. However in this case an extra risk exists, which is that the user takes off his glasses first without thinking about the attached earpieces. In such case, at best an unpleasant pulling sensation is felt in the ear(s), and at worst the connection between earpiece and glasses breaks.

The objective of this aspect of the invention is to use a connector assembly that disconnects when the user puts off his/her glasses, and is easily connected by the user when he/she puts the glasses on. The advantages of the invention are that the insertion and extraction of the earpieces now can be done independently of putting off/on the glasses, as the glasses are not connected during insertion and extraction of the earpieces, and furthermore the risk of breakage of the intermediate unit in case of inadvertently putting off the glasses does not exist anymore. This will be explained in detail below.

Figure 5:
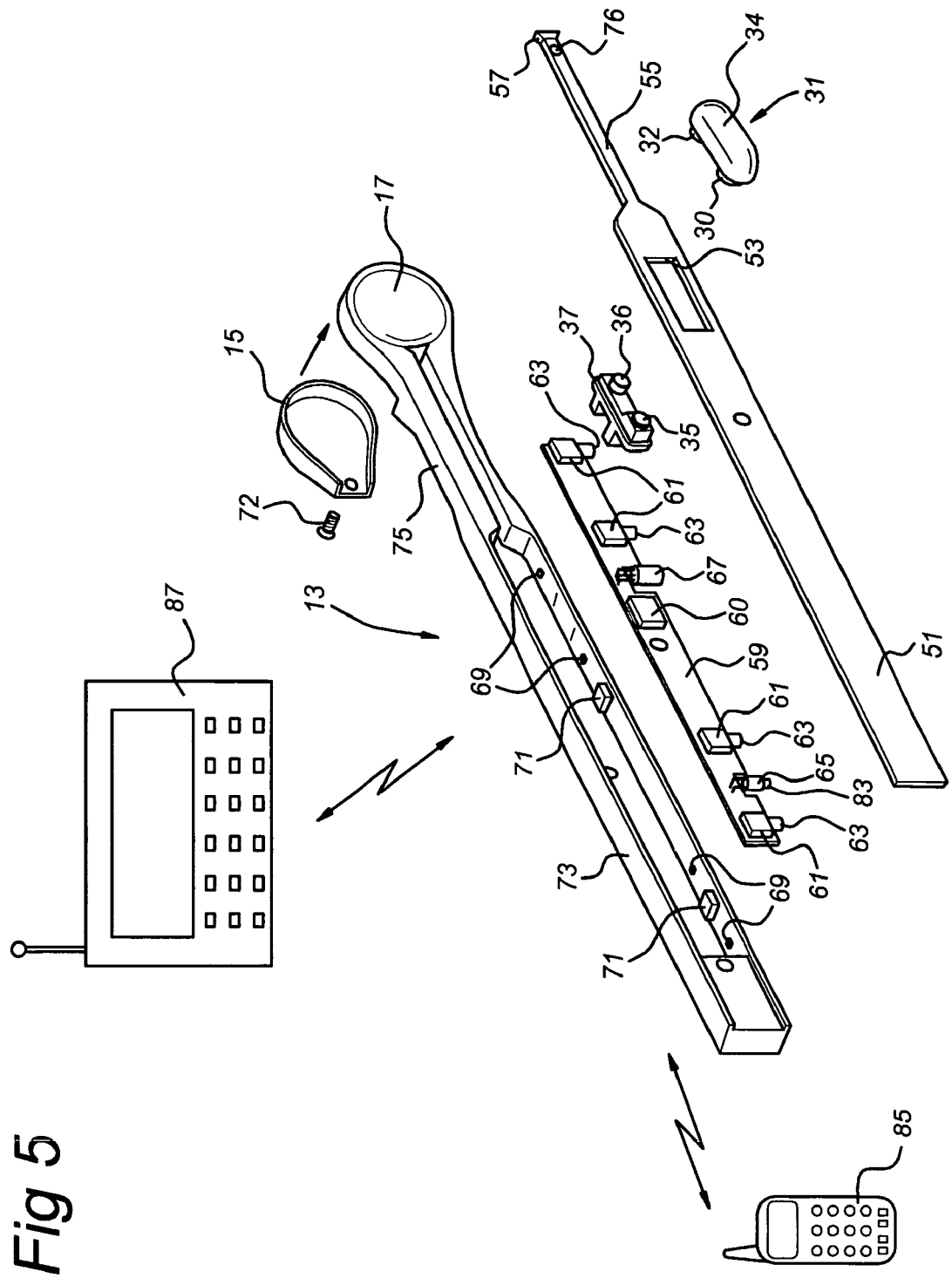
FIG. 5 shows different parts arranged in a glasses temple.
Figure 6A:
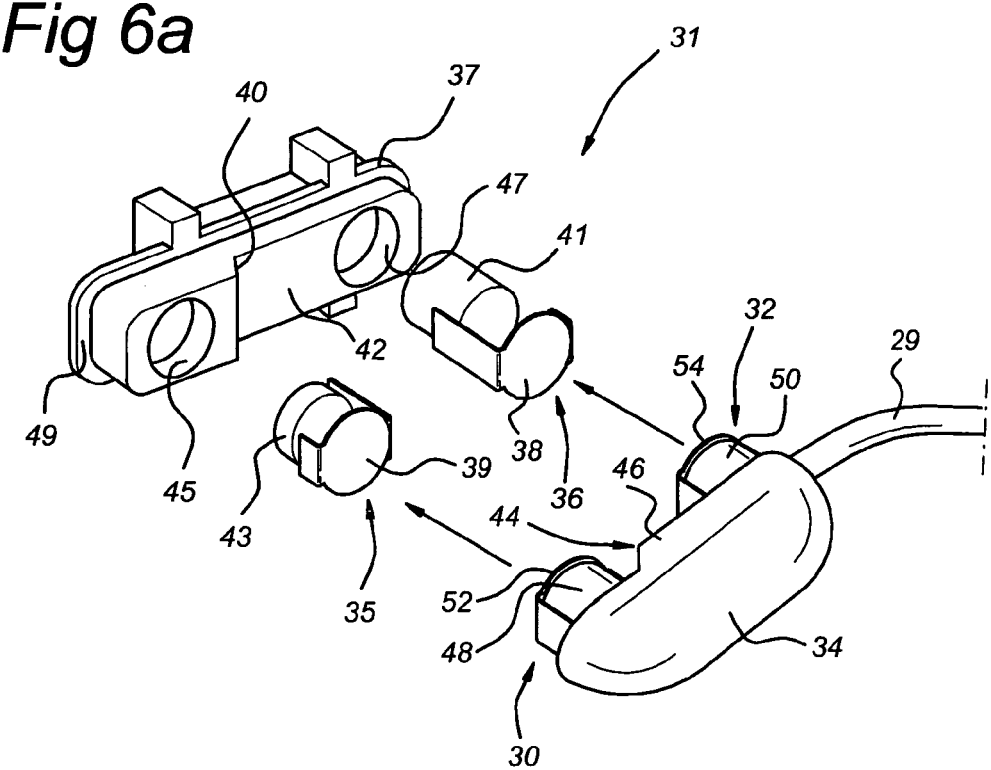
FIG. 6a shows some details of an embodiment of the connector assembly.

FIGS. 4a-4f show different embodiments of a connector assembly 31 used to connect an earpiece 27 of a hearing aid to temple 13 of glasses 23. The connector assembly 31 comprises first and second housings 34, 37. The first housing 34 is attached to the earpiece 27 and is shown in all FIGS. 4a-4f. Second housing 37 is shown in FIGS. 5 and 6a. Second housing 37 does not need to be a separate component, but can be part of the temple 13, in which case the shape of the second housing 37 is for example milled into temple housing 73, or formed during the injection molding of temple housing 73.

The earpiece 27 comprises a speaker (not shown) to transmit sound to an ear of the user. To that end, the earpiece 27 receives suitable input signals from hearing aid components located in the temple 13 (or in other parts of glasses 23). Those input signals are transmitted via wires in a suitable cable 29 that is attached, at one end, to the first housing 34 and, at an opposing end, to the earpiece 27. The first housing 34 can be connected to and disconnected from the second housing 37 in the temple 13 as will be explained hereinafter.

In an alternative embodiment, the earpiece 27 does not comprise a speaker but comprises a hollow channel to lead sound received from a hollow tube, or any other hollow intermediate unit, to the ear. In that embodiment, such a hollow tube substitutes the cable 29. Then, the speaker is e.g. present in the first housing 34 or, alternatively, in the second housing 37 in temple 13. The sound produced by that speaker is then transmitted to the ear via the hollow tube. FIG. 4b shows such a speaker 33 in first housing 34 in a very schematic way.

In a further alternative embodiment, the speaker is present in the temple and is transmitting sound via such a hollow tube that is attached to the temple 13. Then, first housing 34 is located at the end of the hollow tube and is pushed into the earpiece to connect.

Figure 4A:
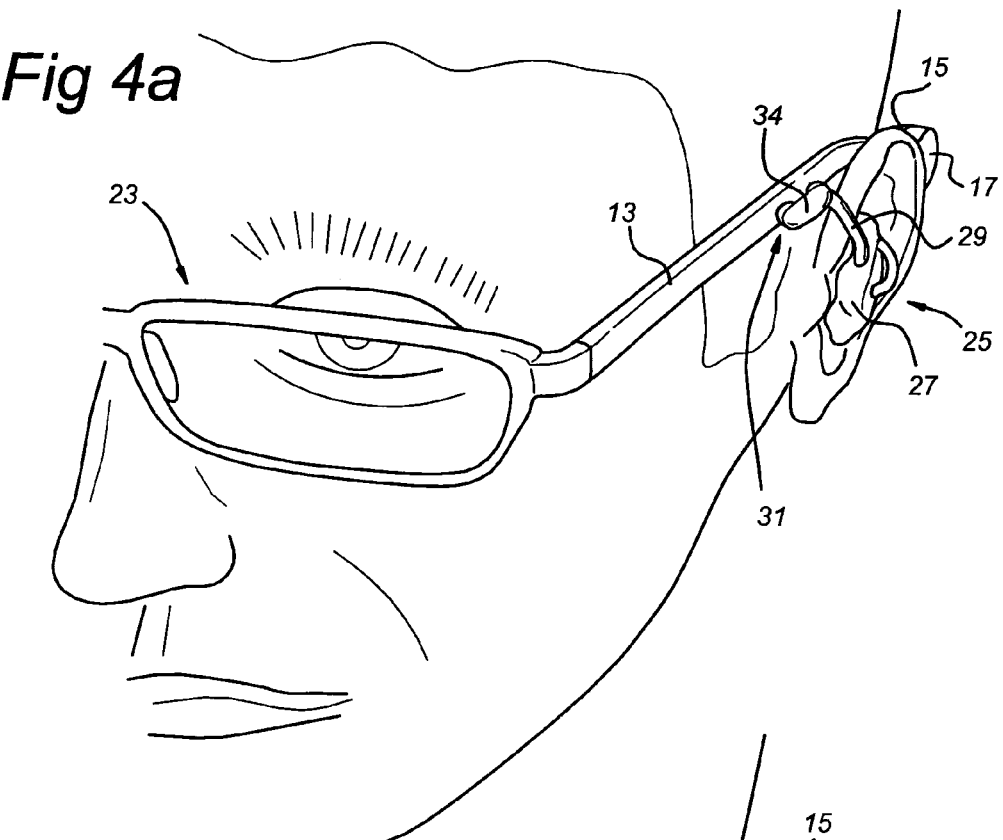
FIG. 4a-4f show different embodiments of a connector assembly for connecting an earpiece of a hearing aid to a glasses temple.
Figure 4B:
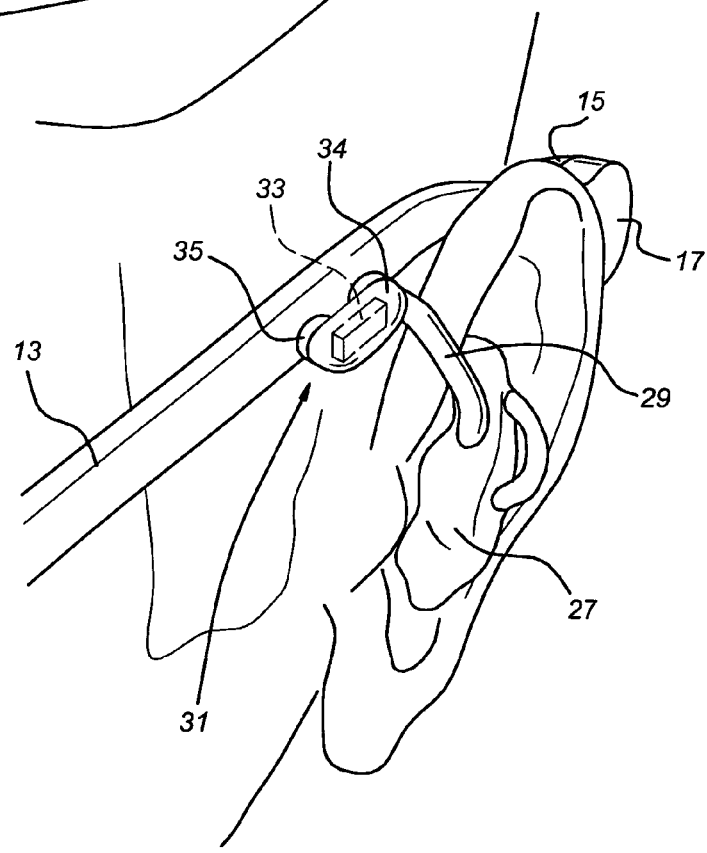
Figure 4C:
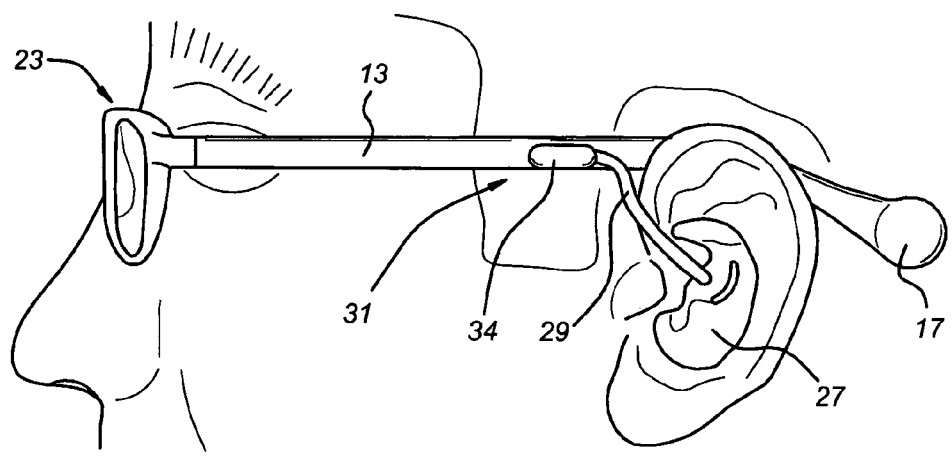
Figure 4D:
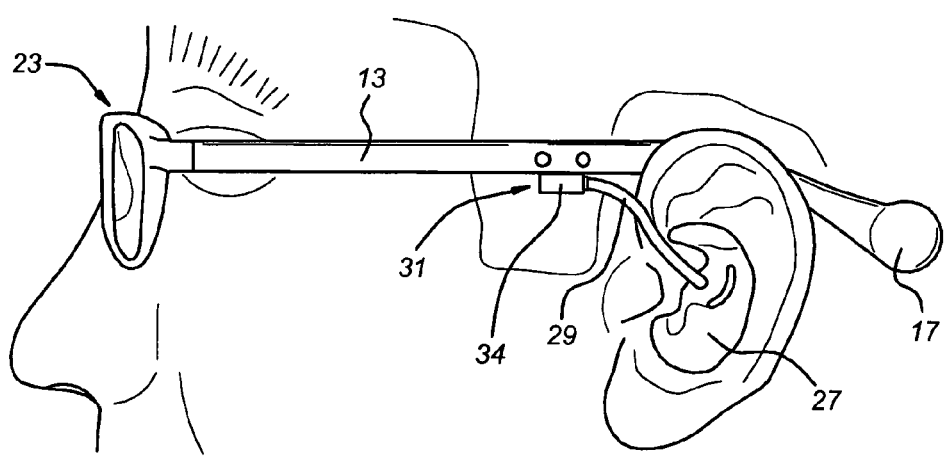
Figure 4E:
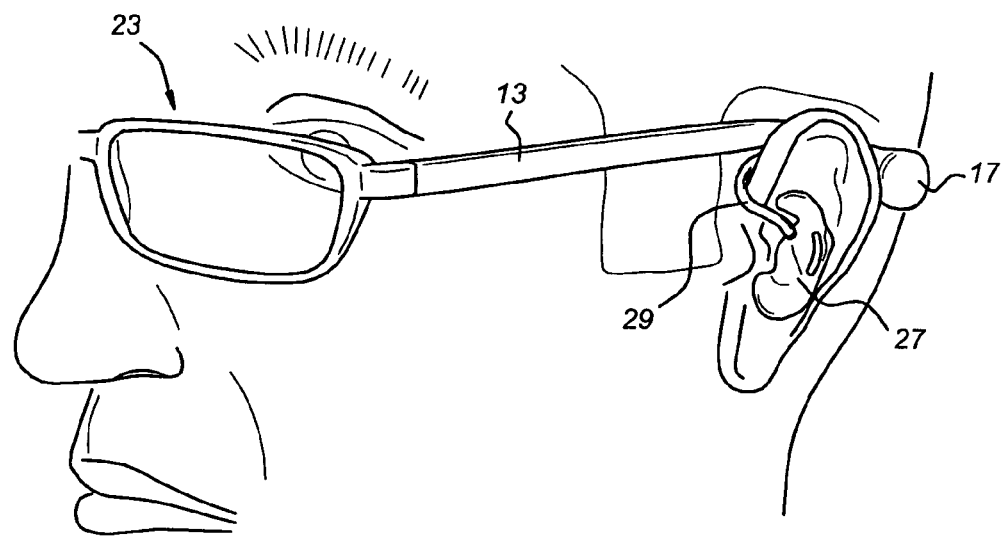
Figure 4F:
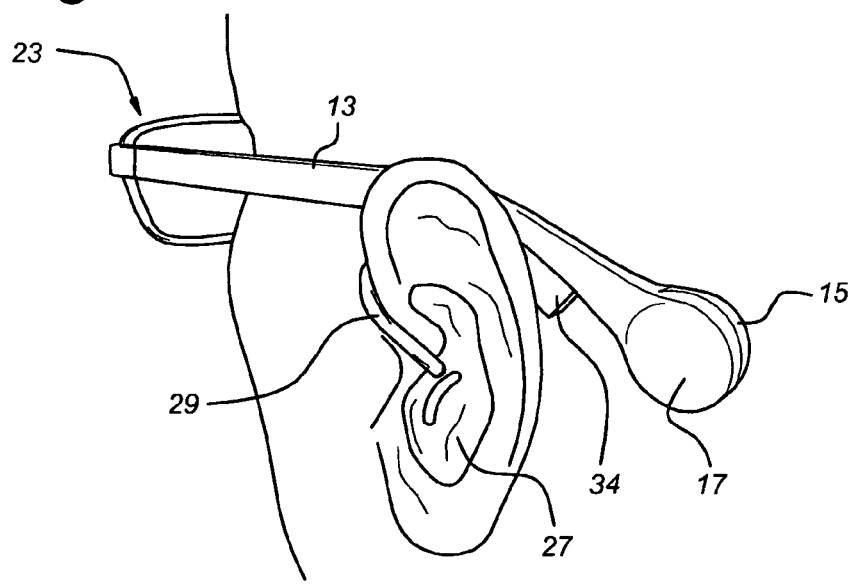

FIGS. 4a-4c show an embodiment in which the first housing 34 is to be connected to an outside of the temple 13 that, in use, faces away from the head of the user. FIG. 4d shows an embodiment in which the first housing 34 is connected to a bottom side of temple 13 that, in use, faces downwards (i.e. to the ground). FIGS. 4e, 4f show an embodiment in which the first housing 34 is also connected to the bottom side of temple 13 that, in use, faces downwards, however, at a position that, in use, is behind the user's ear. In this latter embodiment, the cable 29 (or hollow tube) remains clamped behind the user's ear even when the user has disconnected the temple 13 from the first housing 34. This is more convenient than in the embodiments of FIGS. 4a-4d where the cable 29 (or hollow tube) is dangling in the air when it is disconnected from the temple 13.

In all embodiments of FIGS. 4a-4f, the connector assembly 31 is designed such that the cable 29 (or hollow tube) by means of the first housing 34 can be easily connected to and disconnected from the temple 13, e.g., such that the first housing 34 connects with only a little help of the user and disconnects substantially automatically when the user uses a little force when putting of his/her glasses.

The first and second housings 34, 37 may comprise magnets as shown in FIGS. 5 and 6a in more detail. However, other arrangements of housings that can be easily connected and disconnected are envisaged, like housings with a mechanical snapping connection.

FIG. 5 shows connector assembly 31 with first housing 34 and second housing 37. The second housing 37 is to be accommodated by the temple 13 as will be explained further below. The second housing 37 is preferably made of a synthetic material. As shown in more detail in FIG. 6a, the second housing 37 has a connecting face 40 to be directed to the first housing 34 in order to engage the first housing 34. The connecting face 40 has a recess 42 and first and second openings 45, 47. Moreover, the second housing has an edge 49 the purpose of which will be explained below.

The first opening 45 is designed to accommodate a first contact member 35 whereas the second opening 47 is designed to accommodate a second contact member 36. The first contact member 35 comprises a first magnet 43 covered by a first metal contact plate 39. The second contact member 36 comprises a second magnet 41 covered by a second metal contact plate 38. In its assembled state, the contact plates 38, 39 are connected to suitable conductors (not shown) within the temple 13. These conductors are connected to other hearing aid components in the temple 13 for transporting suitable electrical sound and control signals etc.

It is observed that the term "contact members" is used to refer to members that are designed to connect the two housings 34, 37 to one another such that they are in contact. The term does not necessarily refer to electrical contact.

The first housing 34 has a connecting face 44 to be directed to and engage the second housing 37. The connecting face 44 has an extending portion 46 that is designed to fit into recess 42 of second housing 37 when first and second housings 34 and 37 are engaging one another. The first housing has a third contact member 30 and a fourth contact member 32. The third contact member 30 comprises a third magnet 48 and a third electrical contact 52. The fourth contact member 32 comprises a fourth magnet 50 and a fourth electrical contact 54. The third and fourth magnets 48, 50 are made of a suitable magnetic metal that is attracted by the first magnet 43 and second magnet 41, respectively. In the embodiment where the earpiece 27 has a speaker, the third and fourth electrical contacts are connected to suitable conductors within cable 29 that are connected to such a speaker.

If the first housing 34 comprises such a speaker (cf. FIG. 4b, where a speaker 33 is shown in connector assembly 31 and is attached to a hollow tube) the third and fourth electrical contacts provide electrical sound and control signals to such a speaker. The speaker, then, produces sound that is transported via the tube to the earpiece 27.

If the second housing 37 or the temple 13 comprises a speaker no electrical signals need be transported to the first housing and the electrical contacts 38, 39, 52, 54 can be omitted. The third and fourth contact members 30, 32 need only engage the opposing first and second contact members 35, 36, respectively. Of course, the first and second housings 34, 37 must, then, be designed to allow sound to pass from such a speaker via the tube to the earpiece 27.

In an alternative embodiment, only one of the contact members 35, 36 is provided with a magnet, e.g., only first contact member 35 has first magnet 43 and second contact member 36 has an electrical contact 38 wrapped around a magnetically sensitive but non magnetic material, such as iron. This prevents the second housing 37 from attracting metal parts like chains and iron filings that, when engaged by both first and second magnets 43, 41 cause an electrical short circuit. Another solution would be to provide both the first and second housing 34, 37 with one magnet only.

Magnets can be provided such that first and second magnets 43, 41 are facing outward to first housing 34 with different magnetic poles, whereas third and fourth magnets 48, 50 can also be provided with different poles such that first contact member 35 is attracted by third contact member 30 and second contact member 36 by fourth contact member 32. Then, automatically a correct orientation of the first and second housings 34, 37 relative to each other is guaranteed.

By providing this connector assembly 31 with at least one magnet 41, 43, 48, 50 the first and second housings 34, 37 can be easily connected and disconnected while applying only a small force. This can be further facilitated by providing a rather stiff and only slightly flexible cable 29 (hollow tube). Such a cable 29 (hollow tube) can be made of a synthetic material that can be custom formed, i.e., is made of a material that can be shaped by a customer and keeps a new shape after being deformed by a customer. Then, when the user disconnects the first housing 34 from the second housing 37 by putting off his/her glasses the first housing 34 will remain substantially in its place, thus, facilitating connecting first and second housings 34, 37 when the user puts on his/her glasses again because they will be very close to one another. Using opposing magnet pole combinations further facilitates reconnection since the first and second housings 34, 37 will then attract one another automatically in the proper orientation and direction.

Figure 6B:
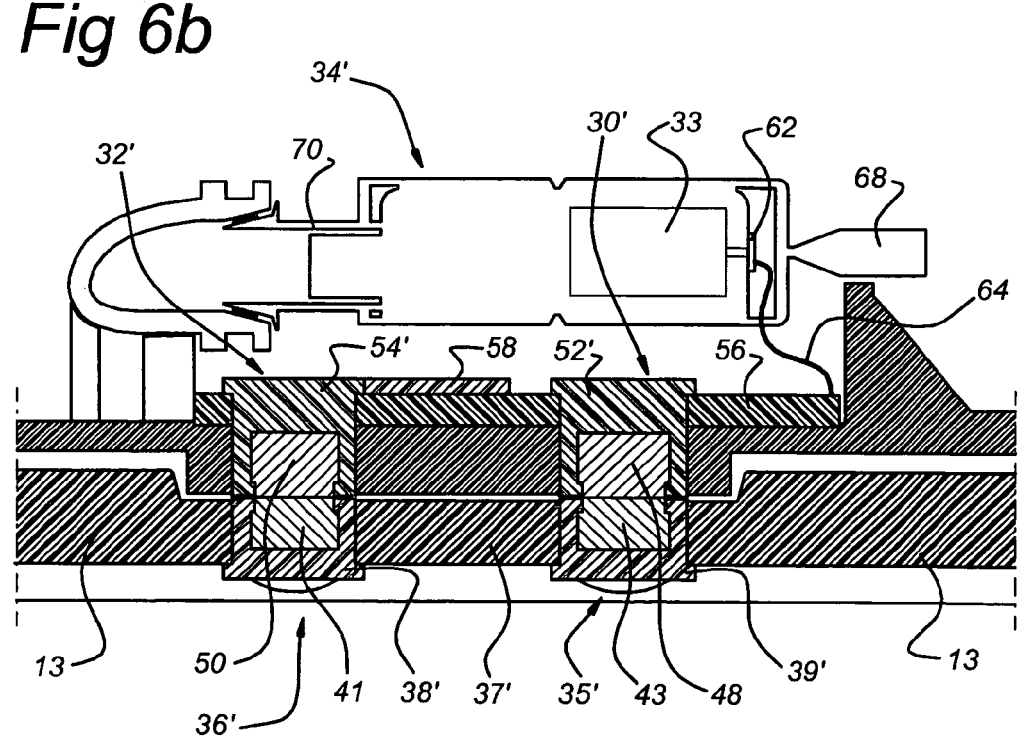
FIG. 6b shows a cross sectional view of an alternative embodiment of the connector assembly.

FIG. 6b shows a cross section of an alternative connector assembly. The same components as in FIG. 6a are indicated with the same reference numbers. Alternative components are indicated with a prime.

FIG. 6b shows mating alternative first and second housings 34', 37'. The first alternative housing 34' accommodates alternative third and fourth contact members 30', 32'. The second alternative housing 37' accommodates alternative first and second contact members 35', 36'.

Whereas FIG. 6a shows an embodiment of the first, second, third and fourth contact members 35, 36, 30, and 32 where they each comprise a magnet covered with a corresponding contact plate and the contact plates contact one another one-by-one via mating surfaces in use, the alternative first, second, third and fourth contact members 35', 36', 30', and 32' of FIG. 6b differ in the following way.

FIG. 6b shows that the first and second magnets 43, 41 are accommodated by respective first and second electrical contacts in the form of metal boxes 39', 38'. Likewise, the third and fourth magnets 48, 50 are accommodated by respective third and fourth electrical contacts in the form of metal boxes 52', 54'. These metal boxes are arranged such that, in use, magnet 41 faces magnet 50, and magnet 43 faces magnet 48, without there being any metal plate between them. The metal box 38' contacts the metal box 54' and the metal box 39' contacts the metal box 52'. Magnet 41 may be a distance away from magnet 50, and the magnet 43 may be a distance away from magnet 48. The mutual distances between magnets 41 and 50, and between magnets 43 and 48, as well as the strength of the magnets determines the magnetic force between the alternative first and second housings 34', 37'. These metal boxes 39', 38', 52', 54' improve the magnetic contacting force between the connector assembly portions. Moreover, these metal boxes 39', 38', 52', 54' are connected to electrical wires via soldering.

Alternatively, the magnets 42, 43, 48, 50 can be gold coated. In this case, the magnets 41, 43, 48, 50 can be directly connected to electrical wires via soldering. As a result one or more of the metal boxes 39', 38', 52', 54' can be left out. Instead of using gold, any other suitable metal coating can be used provided the metal used is magnetic, can be easily coated on the magnets and can be easily connected to electrical wiring. That wiring may be (a portion of) wiring on a printed circuit board as will be explained below.

Figure 6C:
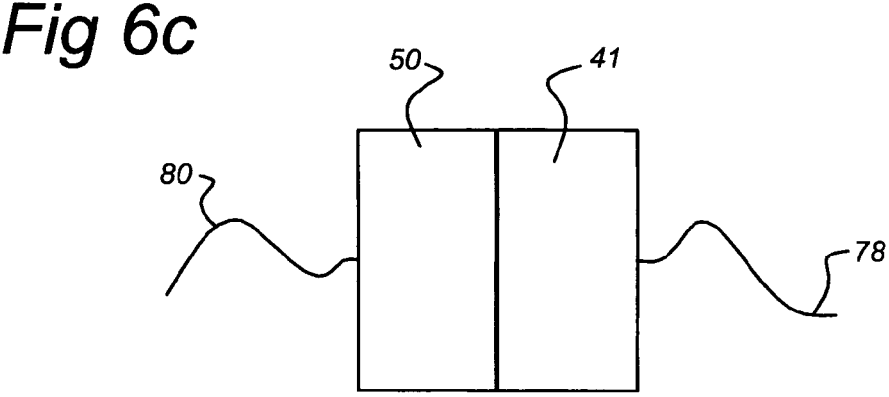
FIG. 6c shows a schematic view of magnets connected to electrically conductive wires.

As a further alternative, magnets 41, 50, 43, 48 may be used that are directly connected to a wire. This is schematically shown in FIG. 6c. FIG. 6c shows magnet 41 contacting magnet 50. Magnet 41 is connected to an electrically conductive wire 78, whereas magnet 50 is connected to an electrically conductive wire 80. These wires 78, 80 may be connected to the magnets 41, 50 by any suitable technique. The magnets 43, 48 may be designed to be connected to suitable electrically conductive wires in a similar or same way.

In general, in the embodiments shown in FIGS. 6a-6d, contact members 30, 31, 35, 36, or 30', 31', 35', 36' are used that are both, at least in part, magnetic such that two contact members exert a magnetic force to contact one another, and are, at least in part, electrically conductive to allow electrical currents to flow from one contact member to the other contact member.

Figure 6D:
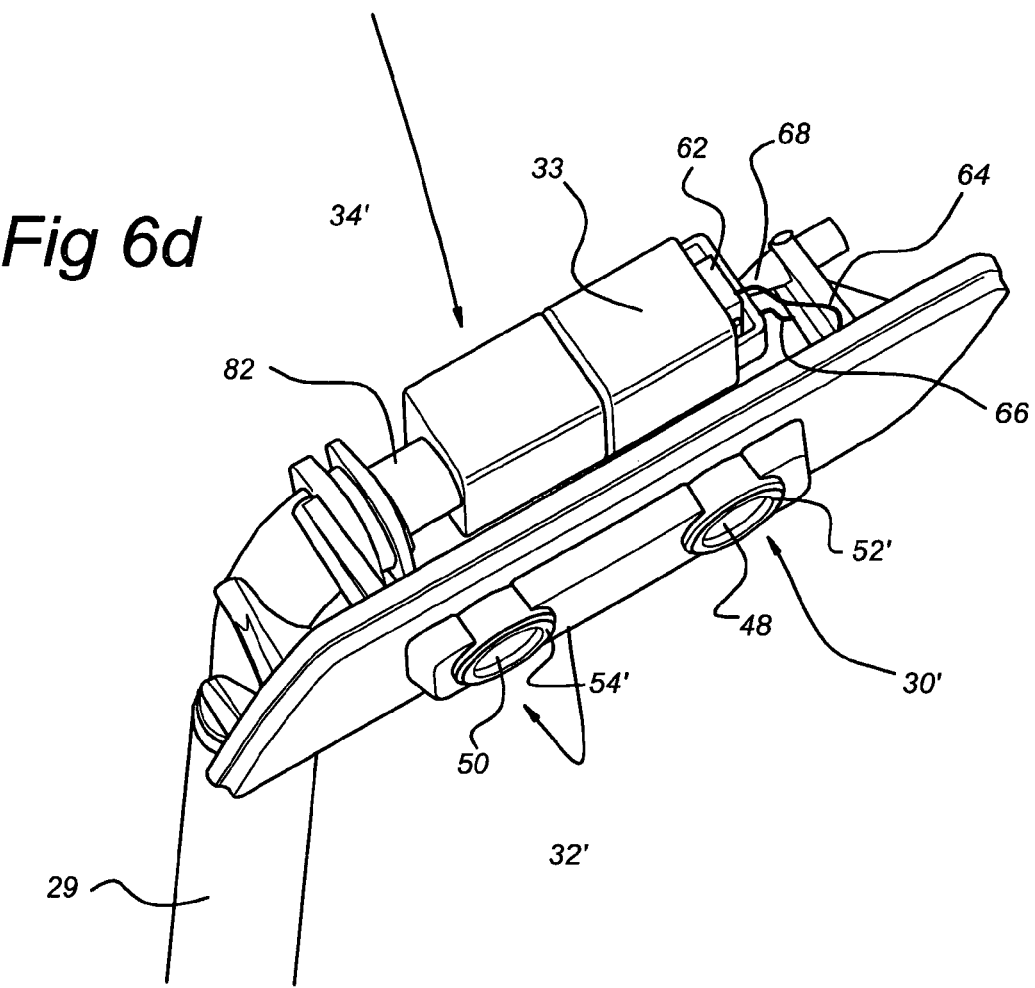
FIG. 6d shows a 3D view of the first housing of the connector assembly of FIG. 6b.

As shown in FIGS. 6b and 6d, in an embodiment, the first alternative connector housing 34' accommodates a speaker 33 receiving suitable signals via wires 64, 66. If the first alternative connector housing 34' comprises such an internal speaker 33, the metal boxes 39', 38', 52', 54' have another advantage. By using metal boxes 39', 38', 52', 54' that have a closed metal surface towards the interior of the first alternative housing 34', the metal boxes 39', 38', 52', 54' function as magnetic shielding and the magnetic field lines are not directed towards the internal speaker 33 which is situated in the interior of the first alternative connector housing 34'. As a result, the internal speaker 33, which consists of metal itself, is pulled less strongly towards the magnets 48, 50 and can vibrate freely in the housing, thus diminishing the known hearing aid problem of mechanical feedback or howling.

A second measure to ensure that the internal speaker 33 can vibrate freely is by the use of flexible sleeves 68, 82 that are attached to the internal speaker 33 and connect the internal speaker sound outlet flexibly to the sound outlet of a hearing aid. This latter feature is used in many hearing aids. New is the invention to use sleeves 68, 82 at two sides of the internal speaker 33 to connect the internal speaker 33 to the remainder of the housing 34'. This way, the internal speaker 33 lies in a type of "hammock" construction. The advantage is that as there are two connection points, both sleeves 68, 82 can be much more flexible than in the case of just one sleeve connection to the housing of the hearing aid. In the case that magnets 48, 50 are positioned towards the internal speaker 33 in the housing the hammock construction has as extra advantage in that the whole hammock construction is pulled somewhat to the magnets 48, 50, but the internal speaker 33 can still vibrate freely.

The contacts 39', 38' of the second housing 37' lie deeper than the surface of the temple 13 in a hole in the temple 13, as shown in FIG. 6b. First housing 34's contacts 52', 54' extend from its housing, into the hole in temple 13 to contact deeper situated contacts 39', 38' of second housing 37'. As a result, in regular use, the possibility of hairs coming between the contacts after connecting the first and second housings 34', 37' is diminished strongly. This is important as occasional contact loss because of hairs is a nuisance to users.

The first housing 34' is fixed to a printed circuit board (pcb) 56. Conductor paths are provided on the pcb 56, of which one conductor path 58 connected to metal box 54' is shown. The use of the pcb 56 as base plate simplifies the production as parts of the production can be performed by automated smd machines, and thus lowers production costs. In addition, the metal boxes of contacts 54', 52' are soldered to the pcb 56 and are thus robustly fixed to the housing, in contrast to gluing them to a plastic housing which results in a much less robust fixation.

Temple.

In a further aspect, the invention relates to a glasses temple arranged to accommodate electronic equipment. In an example, such electronic equipment is part of a glasses hearing aid. However, this aspect is not restricted to such an application. This aspect can also be applied to electronic equipment for other applications, like a headset for a mobile device such as a mobile telephone or personal digital assistant (pda). Below, by way of example only, this aspect will be explained in more detail with reference to its application in a glasses hearing aid.

Glasses temples of high quality can be fitted by the optician to the user's head. To this end, usually, the temples are made of metal, or of plastic with a metal pin inside the plastic. The metal part is required to make sure the plastic after bending does not return to its original form.

Glasses temples that contain electronics require protection that prevent a cavity with electronic equipment being bent, as bending of the electronic equipment harms the electronic equipment.

The objective of this aspect of the invention is to solve this apparent paradox of required bending for fitting and prohibited bending for electronic equipment protection. To this end, a metal plate is attached as protection to a plastic temple enclosing electronic equipment. Only behind the ear, the metal plate decreases in height and becomes a metal pin that can be bent during fitting behind the ear. This will be explained with reference to FIG. 5.

FIG. 5 shows several constructive details of a temple 13. Some of these details have already been explained above and will not be repeated here.

FIG. 5 shows a printed circuit board (pcb) 59. The pcb 59 comprises several microphones 61. Four microphones 61 are shown on the pcb 59. However, this number may differ. The microphones 61 have an extension 63 in use facing downward. However, these extensions 63 may face another direction. The extensions 63 are provided with an opening for receiving sound to enable the microphones 61 to receive the sound and convert the received sound into a suitable electric sound signal. These electric sound signals are supplied to a processor arrangement 60 also connected to the pcb 59. The pcb 59 is also connected to one or more switches 65 to be operated by the user or an operator. In order to allow somebody to operate the switch 65, the switch 65 is provided with a button 83. Moreover, the pcb 59 may be connected to a socket 67 arranged to be connected to a mating plug of a cable (not shown) that can, e.g., be connected to a communication device like a computer. The switch and the socket are connected to the processor arrangement 60. All connections between the electrical components on the pcb 59 are provided via suitable electrically conductive tracks as is known to persons skilled in the art.

The processor arrangement 60 comprises suitable memory, like EEPROM, ROM, RAM, etc. For the sake of simplicity this has not been shown in FIG. 5.

The temple 13 has a metal plate 51. In one embodiment, the metal plate 51 is provided with an opening 53 for receiving the second housing 37. The size of opening 53 may be selected such that, in assembled form, it abuts the edge 49 (cf. FIG. 6a). At its rear side, the metal plate has a narrowed portion 55, e.g., pin-shaped, that can be bent easily. At its terminating portion 57 the metal plate 51 may widen again. At its rear side, the metal plate 51 comprises a hole 76 for receiving the screw 72. The screw 72 is shown in FIG. 2a. In the embodiment shown, the screw 72 attaches the metal plate 51 to the cover member 15 and clamps the rear side portion 17 of the glasses temple 13 in between.

The temple 13 comprises a temple housing 73. The temple housing can be made of injection molded plastic. Alternatively, the material can be a millable material such as plastic or metal. The temple housing 73 is provided with suitable spaces to accommodate both the pcb 59 and the metal plate 51. The pcb 59 is preferably located in a space defined by the temple housing 73 and the metal 51 such that it is covered against external influences. Moreover, the space accommodating the pcb 59 is preferably designed large enough such that the temple 13 may bend slightly under external forces without bending the pcb, thus reducing risk of damaging the pcb 59 as much as possible. This risk is further reduced by the metal plate 51 since it has a relatively large height at the location of the pcb 59 which counteracts any tendency to bend. In this embodiment, metal plate 51 forms an outside wall of the temple 13. The metal plate 51 can be clamped by suitable rims of the first temple housing 73 Alternatively, the first temple housing 73 can be screwed to the metal plate 51, using suitable screws and screw sockets. Moreover, the metal plate 51 can be fixed to the temple housing 73 by a suitable glue.

In another embodiment, a metal strip is attached to the inside of the metal plate 51, thus forming a T profile to even further prevent bending of the metal plate 51 and thus of the temple 13.

In another embodiment, the temple 13 is injection molded, and exists of a single part comprising two sides of the temple housing with a fold line in the middle. During manufacturing, the single part is arranged around the pcb 59 with the electronic equipment and folded together. Then, it is closed with for example glue or lasering, or heat to exactly enclose the electronics and form the temple. In this case, a metal pin may be included in the cavity between the two plastic sides for extra electronics protection.

The narrowed portion 55 of the metal plate 51 fits into a narrowed portion 75 of the temple housing 73. Together with the narrowed portion 75 of temple housing 73, the narrowed portion 55 of the metal plate 51 can be bent easily in order to fit the temple 13 to a human head, behind the ear, (cf. FIGS. 4a-4f) and ensures that after bending the (plastic) temple housing 73 does not return to its original form.

In an embodiment, the narrowed portion 55 of the metal plate 51 and the narrowed portion 75 of the temple housing 73 both have a bent shape, so that little bending has to be done in production and by the optician during fitting of the glasses. This protects electronic equipment.

At its rear side, the temple housing 73 comprises first and second battery contacts 26, 28. The battery contacts 26 and 28, respectively, are connected to electrical contacts 19 and 21, respectively (cf. FIG. 2). The battery contacts 26, 28 are designed to contact a battery (not shown). Two other contacts connected to the poles of the battery are connected to the electrical components on the pcb 59 by suitable conductors (not shown).

The temple housing 73 is provided with suitable holes 69 at its bottom side to receive microphone extensions 63. Moreover, the temple housing 73 comprises suitable holes 71 for receiving switch 65 and socket 67 such that the switch 65 extend through the housing wall and can be operated from outside. Preferably, the temple housing 73 and its holes 69 are designed such that the extensions 63 of the microphones 61 on the pcb 59 can be placed into these holes 69 by a tilting movement, thus limiting the height of the space required for the pcb 59 and thus the height of the temple 13, improving the visual attractiveness of the glasses. During manufacturing, first the socket 67 and the switch 65 may be connected to the pcb 59 by means of relatively long wires. Then, the socket 67 and the switch 65 may be inserted in respective holes 71 and pushed outward. After the pcb 59 has been placed by means of the tilting movement, the socket 67 and the switch 65 may be shifted back into the holes 71 after which they will be fixed, e.g., by gluing.

FIG. 5 shows a mobile telephone 85 and a personal digital assistant (pda) 87. In an embodiment, the processor arrangement 60 on the pcb 59 is arranged to communicate with such a mobile telephone 85 or pda 87 (or another communication device), e.g., by Bluetooth or other wireless communication protocols.

Figure 7:
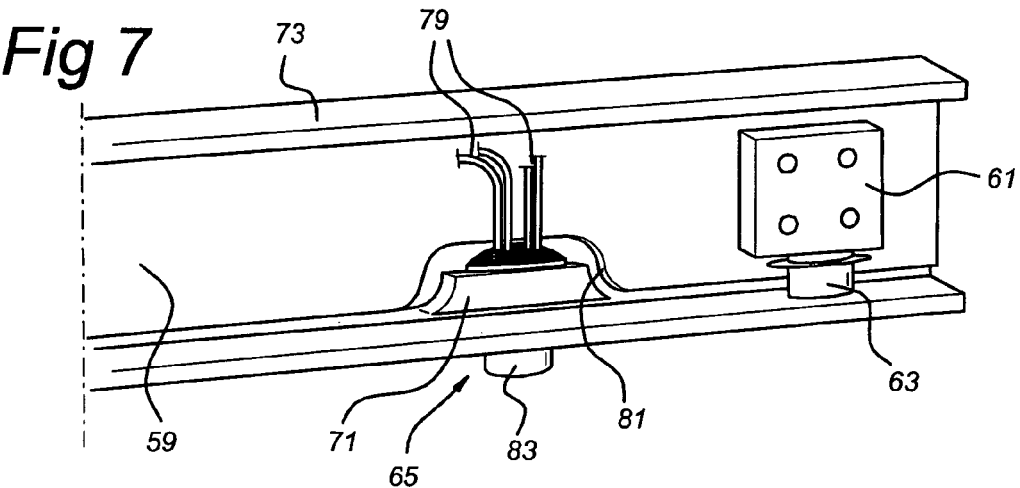
FIG. 7 shows an operation button within a glasses temple.

FIG. 7 shows a detail of pcb 59 on an enlarged scale. The same reference numbers are used for the same components as in FIG. 5. One microphone 61 is shown with its extension 63 inserted into an opening 69 in temple housing 73. The switch 65 and button 83 are rather large. In order to minimize the depth of the space for the electronics and thus of the temple 13, improving the visual attractiveness of the glasses, the switch 65 extends into a notch 81 in pcb 59. The switch 65 is shown to have contact leads 79 connected to the pcb 59 where they contact conducting tracks, as will be apparent to persons skilled in the art. Those tracks are connected to processor arrangement 60. The switch 65 has a button 83 protruding from the temple housing 73 and arranged to be operated by a user or operator.

The socket 67 that is not shown in FIG. 7 and may also have a substantial size, may, like switch 65, also be accommodated in a notch, like notch 81, in pcb 59.

Alternative Cradle.

With reference to FIGS. 1, 2a-2e, 3a-3d, cradle 1 for charging battery 70 located in the hearing aid arranged in glasses through contacts 19, 21; 19', 21' at the rear side of temple 13 has been explained. Now, an alternative cradle 137 will be explained with reference to FIGS. 9a-9g.

Figure 9A:
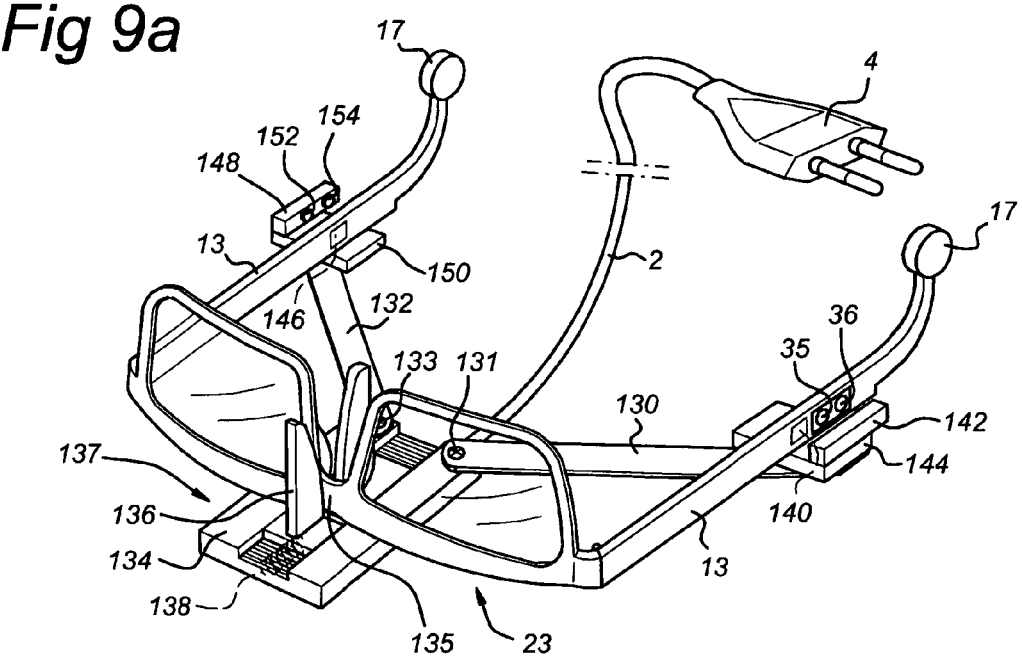
FIG. 9a shows a perspective view of an alternative charging unit to be used to charge a chargeable battery in the hearing aid.

FIG. 9a shows glasses 23 located upside-down in the alternative cradle 137. The cradle 137 comprises a support block 134. A guiding mechanism 136 is provided on the support block 134, that is arranged to receive and keep a nose bridge 135 located between the lenses of glasses 23 when it is in its upside-down position. The guiding mechanism 136 is slid-ably mounted on support block 134. The guiding mechanism 136 can slide across a sliding mechanism 138 that has a corrugated structure such that the guiding mechanism can take a predetermined number of fixed positions relative to the support block 134. Of course, other sliding mechanisms can be provided, e.g., a rail along which the guiding mechanism 136 can be moved together with a fixing mechanism, e.g., comprising a screw or a bolt and a nut.

Support block 134 accommodates transformer 10 (not shown in FIG. 9a) connected to power supply cable 2.

Two arms 130, 132 are connected to the support block 134, preferably via respective hinges 131, 133 attached to one end of the arms 130, 132. Each other end of the arms 130, 132 is fixed to a connector 142, 148, as well as possibly to a magnet 144, 150. At the end where the arms 130, 132 are connected to the connectors 142, 148 they may be made of a flexible material, e.g. rubber. Each connector 142, 148 has two charging contact members. The charging contact members of connector 148 are shown with reference signs 152, 154. The charging contact members of connector 142 are not shown in FIG. 9a. However, they are shown in FIGS. 9b and 9c and indicated with reference signs 156, 158.

Each temple 13 of the glasses 23 may comprise a magnetic switch 140, 146, the purpose of which will be explained below. The magnetic switch may be a Reed switch. FIG. 9a also shows the first and second contact members 35, 36 in temple 13 (the other temple 13 has similar contact members, but they are not shown).

Figure 9B:
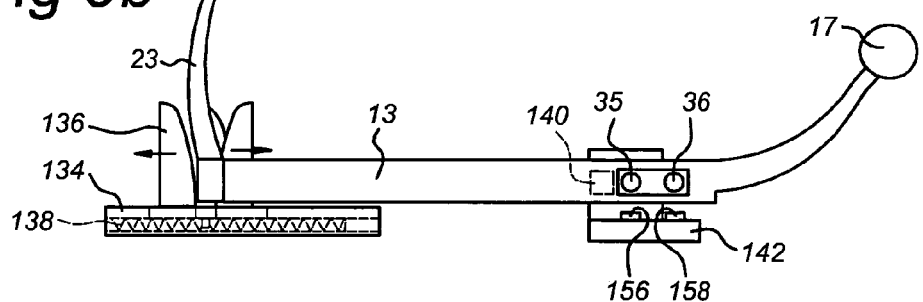
FIG. 9b shows the alternative charging unit of FIG. 9a in side view.
Figure 9C:
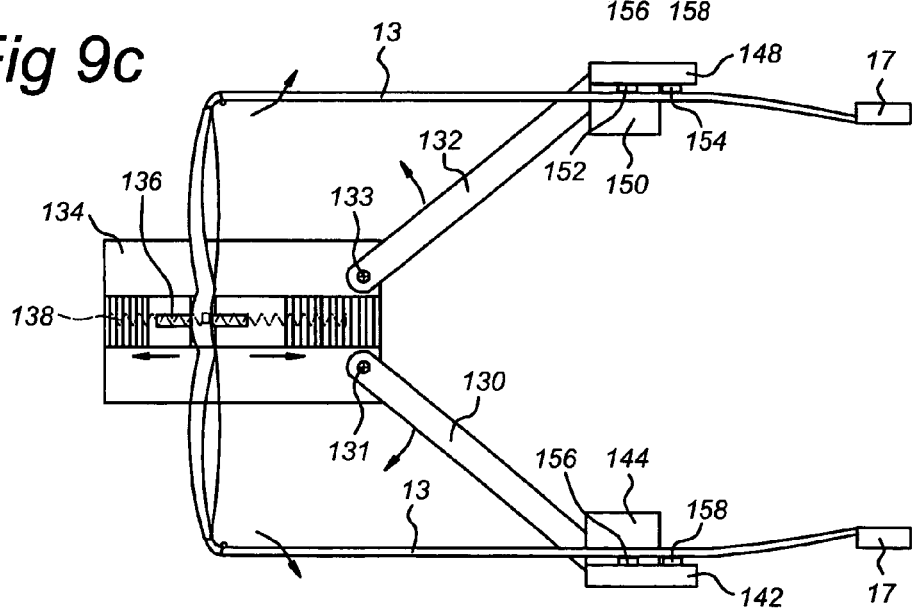
FIG. 9c shows the alternative charging unit of FIG. 9a in top view.

FIG. 9b shows the arrangement of FIG. 9a in side view, whereas FIG. 9c shows the arrangement of FIG. 9a in top view.

Figure 9D:
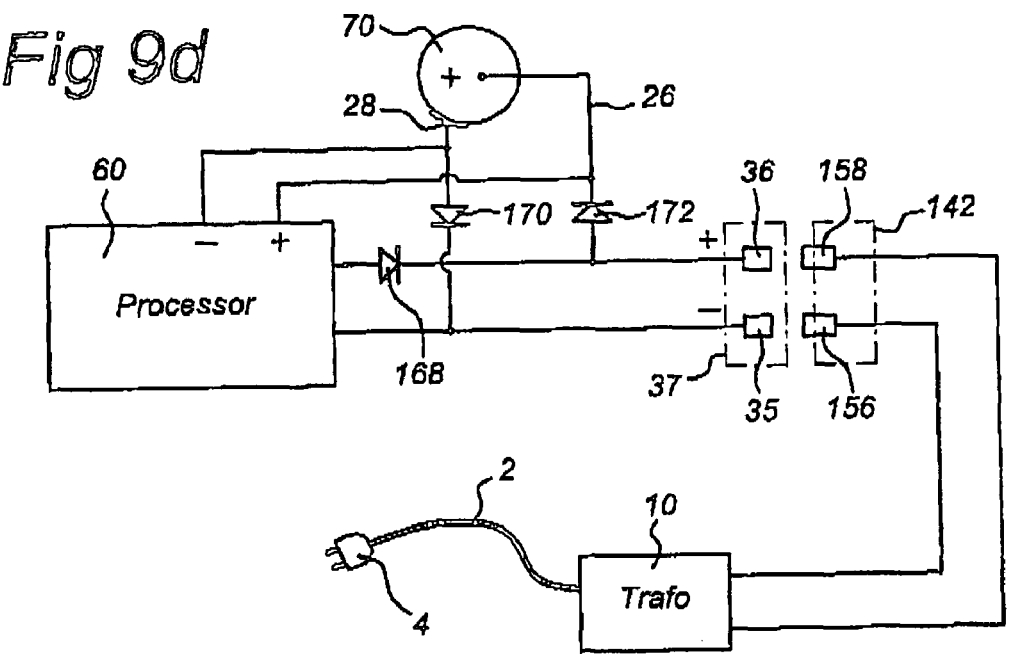
FIG. 9d shows an electronic circuit that can be used in the arrangement of the unit shown in FIGS. 9a-9c.

FIG. 9d shows an electronic circuit in the temple 13 that can be used to charge chargeable battery 70. The battery 70 is connected to the processor 60 in temple 13 to supply the processor 60 with a suitable voltage. In the embodiments explained with reference to the preceding figures the first and second contact members 35, 36 are used to provide signals from processor 60 to a loudspeaker that is e.g. located in connector housing 34 (cf. FIG. 6a). However, in accordance with the embodiment shown in FIGS. 9a-9e, the first and second contact members 35, 36 are also used to receive electrical power from the transformer 10 to charge battery 70.

To that end, in use, charging contact member 158 is contacting second contact member 36 and charging contact member 156 is contacting first contact member 35. It is assumed that charging contact member 158 provides a positive voltage whereas charging contact member 156 provides a negative (or earth) voltage. Second contact member 36 is connected to the positive terminal of battery 70 via a diode 172 to prevent said positive terminal from keeping the second contact member 36 on the positive battery voltage when the transformer 10 is not connected anymore. Similarly, the first contact member 35 is connected to the negative terminal of battery 70 via a diode 170 to prevent said negative terminal from keeping the first contact member 35 on the negative battery voltage when the transformer 10 is not connected anymore. Diode 170 can be left out if all negative terminals have the same voltage, e.g., earth voltage.

Moreover, a diode 168 is arranged between second contact member 36 and the processor 60 in order to prevent the positive charging voltage of transformer 10 from reaching, and possibly destroying, the output of processor 60.

Figure 9E:
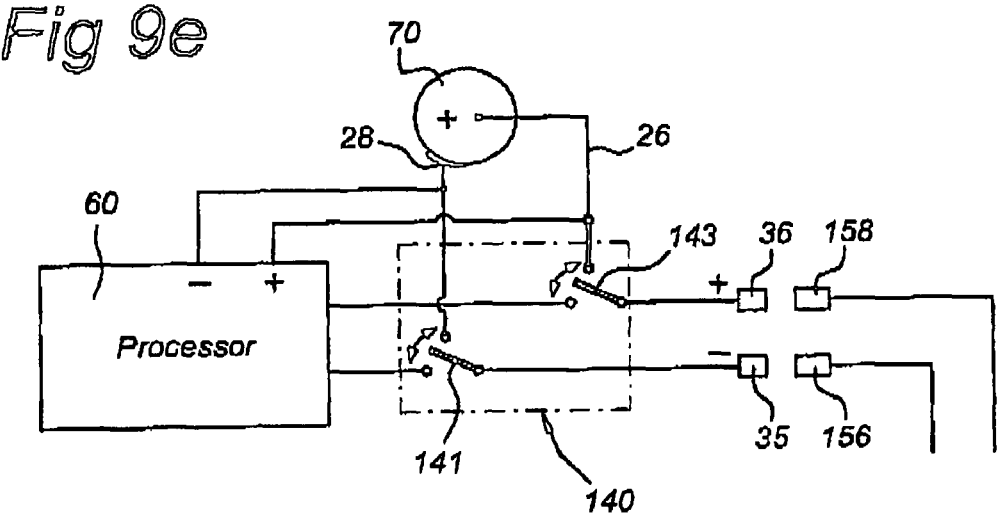
FIG. 9e shows an alternative electronic circuit that can be used in the arrangement of the unit shown in FIGS. 9a-9c.

FIG. 9e shows an alternative electronic circuit that can provide the same function as the one shown in FIG. 9d. In the circuit of FIG. 9e, two switches 141, 143 are provided. A first switch 141 is connected to first contact member 35 and is arranged to connect first contact member 35 to either the positive terminal of battery 70 or to the (negative) output of processor 60. A second switch 143 is connected to second contact member 36 and is arranged to connect second contact member 36 to either the positive terminal of battery 70 or to the (positive) output of processor 60. Switch 141 can be left out if all negative terminals have the same voltage, e.g., earth voltage.

The switches 141, 143 are, in an embodiment, Reed switches that are operated by a magnetic force that is exerted by magnets 144, 150 located on arms 130, 132 when the arms 130, 132 are positioned such that the first and second contact members 35, 36 can contact charging contact members 156, 158. In that case, the switches 141, 143 connect the contact members 35, 36 to the associated terminals of the battery 70. Otherwise, when the switches 141, 143 are not operated by the magnets 144, 150 the switches 141, 143 connect the contact members 35, 36 to the associated outputs of processor 60.

Thus, this embodiment uses the first and second contact members 35, 36 on the temple 13 of the connection assembly as described earlier also for charging the battery 70. This is possible since connecting an earpiece to the hearing glasses in use, takes place at exclusively different moments from the moments that the battery 70 needs charging. Charging takes place when the hearing glasses are not in use by the user. Therefore it is possible to use the first and second contact members 35, 36 for both the connection of the earpiece and the charging of the battery 70 in the hearing glasses.

Like in the embodiments of the earlier figures, the contact members 35, 36 of housing 37 are connected to contact members 156, 158 of connector housing 142 by magnetic force, whereas they establish electrical contact at the same time.

As described earlier for the charging cradle shown in FIGS. 1 and 3a-3d, an obstacle to overcome by a charger of rechargeable batteries in pairs of glasses is that the position of temples varies widely for different pairs of glasses. This is not only due to varying temple lengths and front widths of the glasses, but also because temples are bent by an optician when fitting to a user's head.

The alternative charging apparatus of FIGS. 9a-9c deals with this obstacle in the following ways:

1. The magnetic force ensures the first and second contact members 35, 36 are attracted to the charging contact members 156, 158. By attaching the charging contact members 156, 158 to a flexible, e.g. rubber, end at the arm 130, the contacts seek each other despite positioning differences caused by bending.

2. The position of the guiding mechanism 136 is adjustable relative to the support block 134, and thus relative to the arms 130, 132. Thus adjustments can be made to cope with differences in temple lengths.

After having set the guiding mechanism 136 relative to the support block 134 for a specific pair of glasses, the user, wishing to charge the battery of the glasses, simply puts the nose bridge 135 of the glasses in the guiding mechanism 136 and opens the temples 13 of the glasses until the respective contacts contact one another by the magnetic forces, as explained above.

Figure 9F:
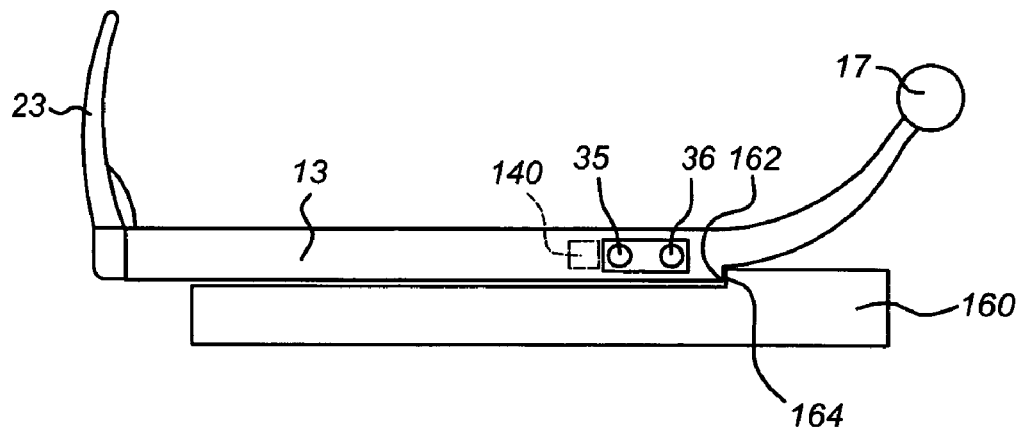
FIGS. 9f and 9g show a further alternative charging unit.
Figure 9G:
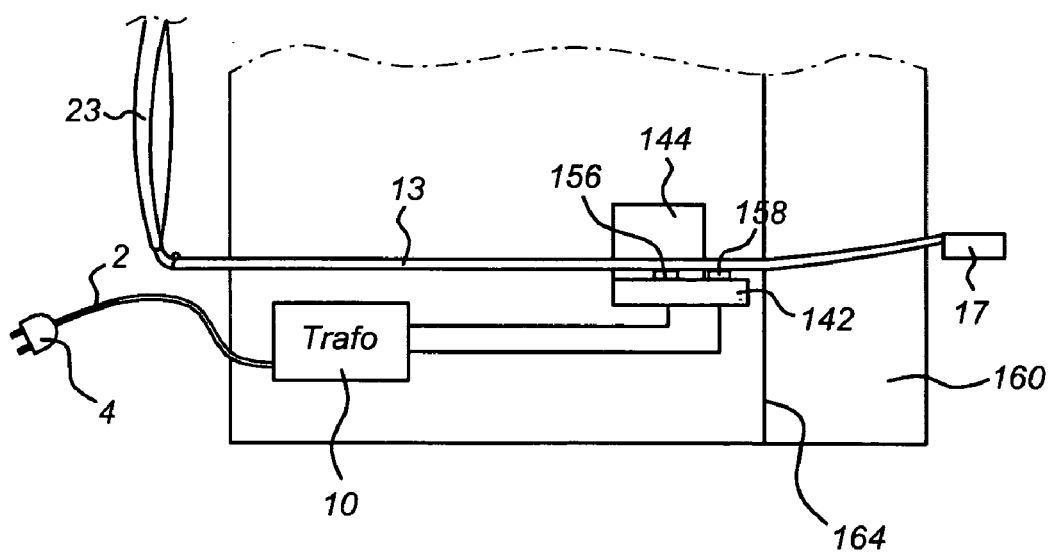

In another embodiment, shown in FIGS. 9f and 9g, the charger makes use of a small notch 162 located at the rear side of the temple 13. In this embodiment, the charging unit comprises a support base 160 comprising a ridge 164, against which the notch 162 should be located in order to align the first and second contact member 35, 36 with the charging contact members 156, 158. Instead of a ridge 164, any other technical equivalent alignment unit may be used, like a slit or hole in the support base 160 designed to accommodate notch 162 such that the first and second contact member 35, 36 are aligned with the charging contact members 156, 158.

Instead of the support base 160 extending underneath the glasses as shown in FIG. 9f, the support base 160 can alternatively be positioned next to the glasses. In this case, the ridge 164 is one side of the support base 160, and the glasses are lying upside down next to the support base 160, on a table for example, contacting the ridge 164 of the support base 160 with notch 162.

By laying the glasses upside-down as shown in FIGS. 9f and 9g, the notch 162 at the rear side—instead of the nose bridge 135—can be used to position the glasses with stretched temples 13 against the ridge 164. Again, magnetic force is used to provide the contact force. Connector 142 with the charging contact members 156, 158 may, again be attached to a flexible, e.g. rubber, end of an arm, by which the contacts seek each other despite positioning differences caused by bending. But in this case no adjustment of the charger is required for different temple lengths, because the notch 162 at the rear side of the temples 13 is positioned at the same position in relation to the connector 142, irrespective of the temple length.

Yet in another embodiment the charger uses the magnetic force of the connector housing within the temple 13, but not the contact members themselves. In this case separate charging contacts are mounted in the temple connector housing. The charger connects to the temple through magnetic force in the same way as described in the embodiments above. However the charging current flows through the separate charging contacts in the connector housing. The advantage is that no diode or switch is required to ensure the current flows to the battery and not to the processor. These charging contacts are supported by and located on the pcb 59 and, preferably, also extend through opening 53 in metal plate 51 to allow contacting the charging contacts of the charger.

It is observed that the charger explained with reference to FIGS. 9a-9g has as an additional advantage that the rear sides of the temples 13 do not comprise any electrical contacts 19, 21; 19', 21' anymore, which is aesthetically more attractive. Moreover, the charger is smaller than the one shown in FIGS. 1, 3a-3d.

User Interface.

The user interface comprises the switch 65. Preferably, the switch 65 is intended to be operated by the wearer of the glasses and located at the front side of the temple 13 where "front side" is defined as the side where the temple is connected to the portion of the glasses 23 designed to accommodate the lenses. This is where the wearer normally puts his/her fingers to put on or to put off his/her glasses. So, this is a convenient location for the wearer to operate the button 83 of the switch 65. The switch 67 is intended to be operated by a hearing aid dispenser and can be located more to the rear side of the temple 13, i.e., the side to be put on the human ear.

Both temples of the glasses 23 can be provided with two (or more) such switches 65. However, in an embodiment, each temple may have just one switch, one to be operated by a wearer and one to be operated by the hearing aid dispenser. This is a feasible option if the glasses comprise a single processor arrangement 60 common to both temples, or if both temples are wirelessly connected. Then, manufacturer, i.e. default, settings of this single processor arrangement 60 can be adjusted by the hearing aid dispenser via a single switch on one of the temples where the other switch is used by the wearer to adjust user settings of the hearing aid like gain, directivity or beam forming for both ears.

The processor arrangement 60 that is connected to the switch 65 is arranged to receive a signal from these switch 65, indicating how long the button 83 is pushed by the user/operator. In an embodiment, three different operating modes can be distinguished:

1. short push
2. long push
3. very long push

The short push may take e.g. between 0 and 0.5 sec., the long push may e.g. take between 0.5 and 2 sec. whereas the very long push may e.g. take longer than 2 sec. Of course, other examples are possible. By operating the button 83 in the short push mode, the user/operator instructs the processor arrangement 60 to jump through consecutive programs like directivity, beam forming, volume, and telecoil. By operating the button 83 in the long push mode, the user/operator may instruct the processor arrangement 60 to search a certain setting within the selected program, or it may just select a specific program. By operating the button 83 in the very long push mode, the processor arrangement 60 is, e.g., instructed to reset all settings back to the manufacturer default settings, or to reboot, or to shut down.

The program "directivity" determines the main hearing direction or directions of the hearing aid. The hearing aid can, e.g., be programmed to have a single main hearing direction for both temples, extending substantially parallel to the temples in use, i.e., when the glasses are worn by the user and the temples are supported by the human ears. Alternatively, the hearing aid may have two different main hearing directions, i.e., one main direction per temple and per ear. These two different main directions may form opposing angles to the direction in which the temples extend. Such a plurality of different main directions of hearing aid glasses is explained in detail in European patent application EP-A-1 025 744 which is incorporated herein by means of reference.

Setting a suitable gain volume can in one embodiment be done by the long push mode. The gain is adapted by a predetermined amount after each long push. The volume may, e.g., be adjustable in 3 steps. Each time the user pushes long, the volume makes one increasing step. When the volume has reached a maximum level the steps will be reversed, i.e., the volume will be decreased in steps. When the volume has reached a minimum level, the steps are reversed again, etc.

The telecoil program relates to functionality of the hearing aid to receive radio waves from a transmitter in, e.g., a theater or concert hall, that include the sound produced at that moment in the theater/concert hall such that the user of the hearing aid can better listen to, e.g., a theater play. In one embodiment the telecoil program can be selected or deselected by applying the long push mode.

Adapting settings of the programs to be executed by the processor by the hearing aid dispenser can be performed in the same way.

Updating Hearing Aid Software.

In an embodiment, the invention relates to updating hearing aid software. Now, a description of updating hearing aid software will be given. The hearing aid may comprise functional modules as explained in detail in WO2004/028203. However, other types of hearing aids may be used instead.

The functionality of a hearing aid is preferably implemented by software. Once a hearing aid has been bought and time passes by, this software will become outdated. The present invention, in an embodiment, provides for a suitable way of keeping the software as up to date as possible. Basically, this can be done by means of a computer arrangement as shown in FIG. 8.

Figure 8:
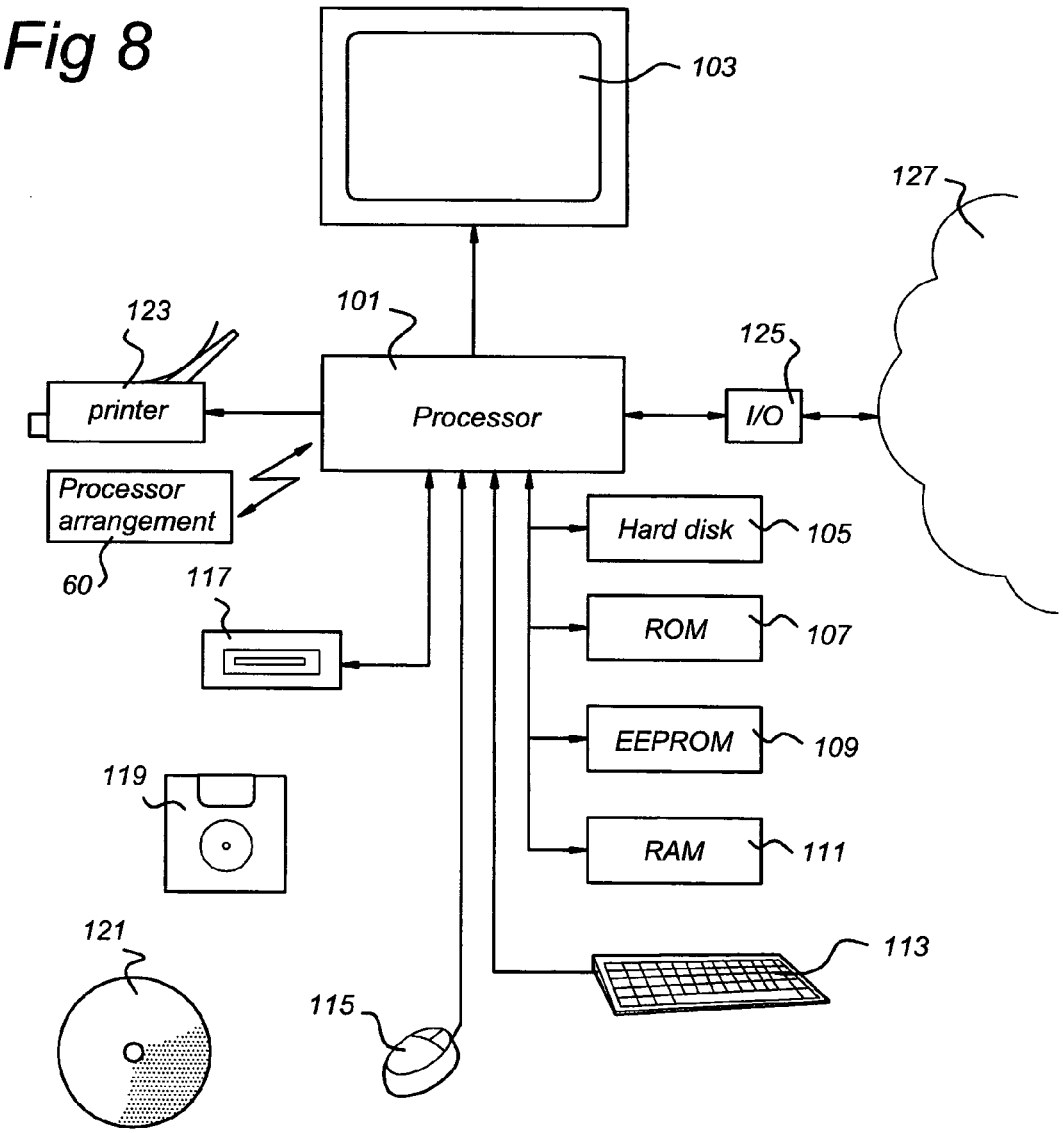
FIG. 8 shows a computer arrangement to be used in an aspect of the invention.

In FIG. 8, an overview is given of a computer arrangement that can be used to carry out the method according to the invention. The arrangement comprises a processor 101 for carrying out arithmetic operations.

The processor 101 is connected to a plurality of memory components, including a hard disk 105, Read Only Memory (ROM) 107, Electrically Erasable Programmable Read Only Memory (EEPROM) 109, and Random Access Memory (RAM) 111. Not all of these memory types need necessarily be provided. Moreover, these memory components need not be located physically close to the processor 101 but may be located remote from the processor 101.

The processor 101 is also connected to means for inputting instructions, data etc. by a user, like a keyboard 113, and a mouse 115. Other input means, such as a touch screen, a track ball and/or a voice converter, known to persons skilled in the art may be provided too.

A reading unit 117 connected to the processor 101 is provided. The reading unit 117 is arranged to read data from and possibly write data on a data carrier like a floppy disk 119 or a CDROM 121. Other data carriers may be tapes, DVD, memory sticks etc., as is known to persons skilled in the art.

The processor 101 is also connected to a printer 123 for printing output data on paper, as well as to a display 103, for instance, a monitor or LCD (Liquid Crystal Display) screen, or any other type of display known to persons skilled in the art.

The processor 101 may be connected to a communication network 127, for instance, the Public Switched Telephone Network (PSTN), a Local Area Network (LAN), a Wide Area Network (WAN), the Internet, etc. by means of an I/O device 125. The processor 101 may be arranged to communicate with other communication arrangements through the network 127.

The processor 101 may be implemented as stand alone system, or as a plurality of parallel operating processors each arranged to carry out subtasks of a larger computer program, or as one or more main processors with several subprocessors. Parts of the functionality of the invention may even be carried out by remote processors communicating with processor 101 through the network 127.

The processor is arranged to communicate with the processor arrangement 60 accommodated in temple 13, e.g. wireless or through a cable connected to the socket 67 in the temple 13.

The computer arrangement shown in FIG. 8 may be located at the premises of a wearer of the hearing aid glasses. Alternatively, it may be located at the premises of a hearing aid dispenser who sells such hearing aid glasses to end-users. The computer arrangement may be used to update the programs to be executed by processor arrangement 60 in different ways.

The computer arrangement shown in FIG. 8 may be arranged, as controlled by suitable software instructions and data stored in memory 105-111, to download updates of software programs (or version parameters) from a server that stores latest software/parameters from a manufacturer of hearing aids, that can be executed by the hearing aid glasses processor arrangement 60. Moreover, processor 101, as controlled by other suitable software instructions and data stored in memory 105-111, is then arranged to communicate such updated software programs or parameters to the processor arrangement 60 once a communication link is established between the processor 101 and the processor arrangement 60. This setup can be used both in a home environment of an end-user or at the premises of a hearing aid dispenser who sells hearing aid glasses. The updated software and/or parameters can be downloaded by computer arrangements from a website that is controlled by, e.g., a manufacturer of hearing aid glasses. The updated software and/or parameters can be distributed automatically to such computer arrangements upon any new release, e.g., on a subscription basis at any time that the computer arrangement is connected to the Internet.

In a very advantageous embodiment, the hearing aid dispenser does not need to download updated versions of the software and/or parameters. In such an embodiment, the processor 101, as controlled by suitable instructions and data stored in memory 105-111, is arranged to communicate with processor arrangement 60 of hearing aid glasses and to check the version number of the software running on the processor arrangement 60, or of the parameters used by the software running on the processor arrangement 60. Moreover, the computer arrangement as shown in FIG. 8 stores software and parameters with a certain version number itself in memory 105-111. The processor 101 checks whether the version number of the software/parameters on the processor arrangement 60 is more recent than the version number of the software/parameters stored in memory 105-111. If the version number of the software/parameters stored in memory 105-111 is more recent than the version number of the software/parameters stored in processor arrangement 60, then, this stored software/parameters is/are transmitted to the processor arrangement 60 and used by the processor arrangement 60 to update its own software/parameters. In case the version number of the software/parameters stored in memory 105-111 is older than the version number of the software/parameters stored in processor arrangement 60, then, this software/parameters of the processor arrangement 60 are transmitted to the processor 101 and stored by the processor 101 in its own memory 105-111. The processor 101 can then later use the updated software/parameters to update other hearing aid glasses when they are arranged to communicate with the processor 101 to find out whether it has more recent software/parameters. This setup is especially advantageous for hearing aid dispensers. They can, thus, keep their software/parameters for the hearing aid glasses reasonably up to date. In practise, they will be visited by hearing aid glasses wearers regularly for different consultant purposes and, in this way, they can use the hearing aid glasses of those wearers to update their software and/or parameters. Secondly it is advantageous for the glasses manufacturer. The manufacturer does not have to wait with the introduction of an improvement in newly produced glasses until all dispensers have updated their fitting software. Instead the manufacturer can immediately introduce software and/or parameter improvements in newly produced glasses, which will spread automatically to the software of the hearing aid dispenser. The fast introduction of improvements of course benefits the user as well.

In an alternative embodiment, the processor 101 does not communicate with processor arrangement 60 directly but with the cradle processor 16 (cf. FIG. 1). This cradle processor 16 is also arranged to communicate with the processor arrangement 60, e.g., via Bluetooth or through contacts in the temple 13 that connect to contacts in the cradle 1 when positioned in the cradle 1.

In an alternative embodiment, the processor arrangement 60 is connected to the transceiver 18 when the temple 13 is put into cradle 1 by suitable connecting members. Then, the processor arrangement 60 uses the transceiver 18 to communicate with external devices like processor 101, e.g. for updating it's software/parameters. The advantage is that the electrical power to communicate with external devices does not need to be derived from the battery within the temple 13 but can be derived from transformer 10 within cradle 1.

In a further alternative, another communication device like pda 87 or mobile telephone 85 is used for the updating process. They already have the equipment to communicate with other devices like processor 101, so, they can easily be programmed to download latest software/parameters from processor 101 and transmit this further to processor arrangement 60, either directly or via processor 16/transceiver 18 in the cradle 1. Here, the hearing aid glasses can be a headset of such a communication device like pda 87, mobile telephone 85, as, e.g., explained in more detail in WO2004/028203.

Resetting Processor of Hearing Glasses to Default Program.

Hearing aids need to be restarted and reset to a default program from time to time. Restarting, also called rebooting, is required to ensure the software keeps running properly. Resetting the hearing aid to default settings, for example a default user-program, ensures that the user has the hearing aids for left and right ear in the same setting. This is crucial for binaural listening.

Regular hearing aids that run on replaceable batteries get a restart and a reset when the batteries are replaced, or when the user pulls out the battery to stop the hearing aid functioning. This is not possible with rechargeable batteries.

One solution for a rechargeable hearing aid is to include an on/off switch on the hearing aid. But this has the disadvantage of an extra button, which takes space and increases costs.

This embodiment of the invention does not require an extra button. In this embodiment, the processor 16 of the charge cradle controls the transformer 10 to generate such a charging voltage that it contains commands that can be recognized as restart/reset commands by processor 60. The processor 60 (possibly together with a separate controller) may have a function that continuously examines the voltage or current that the battery 70 provides in order to shut down when the battery is low. This function can be used to recognize the commands from the charger. That can, e.g., be done by shaping the charging voltage as generated by transformer 10 such that it contains charging pulses for battery 70 in a pattern that the processor 60 in the hearing aid receives as current or voltage increases/decreases and recognizes as such commands. Alternatively, the charging voltage can be a DC voltage having an AC voltage superimposed on it which AC voltage can be recognized as such commands.

Figure 10:
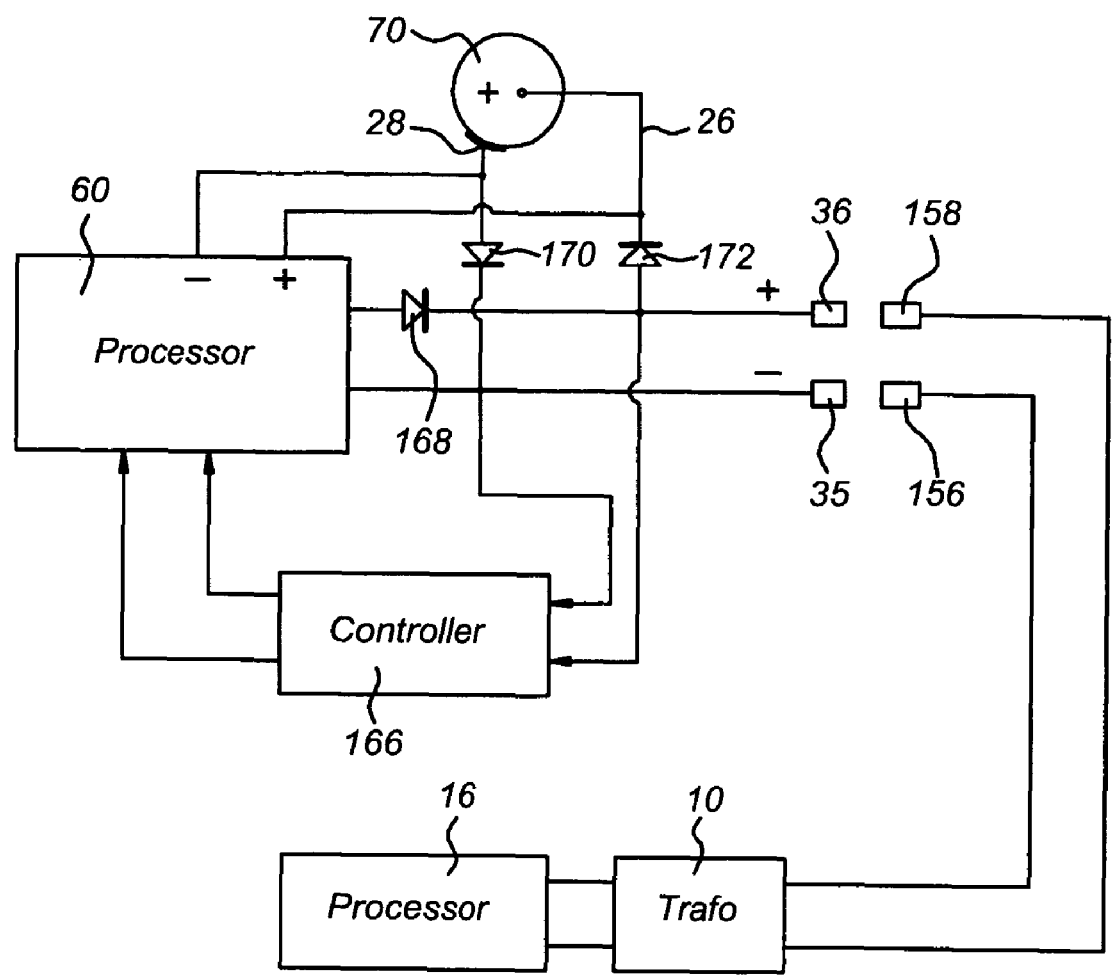
FIG. 10 shows an electronic circuit that can be used to restart and/or reset a hearing aid.

FIG. 10 provides an implementation of this embodiment. The implementation shown in FIG. 10 comprises all the components shown in FIG. 9d. Additionally, the implementation comprises a controller 166 that is connected to and receives input signals from first and second contact members 35, 36 when they are connected to the charging contact members 156, 158. The controller 166 is designed to derive the command signals as present in the charging voltage and to provide such command signals to the processor 60, which, upon receiving the command signals, restarts/resets the hearing aid. The controller 166 may be part of the processor 60, as a person skilled in the art will understand.

Of course, instead of using the setup of FIG. 9d, the setup of FIG. 9e can be used as a starting point for an alternative implementation.

Moreover, the concept of this embodiment can be used in any arbitrary hearing aid with a chargeable battery where the hearing aid needs to be restarted of reset.

Selling Hearing Aid Glasses.

In a last aspect, the invention relates to a method of selling hearing aid glasses to clients. This method includes the following actions:

a) selecting by a client a selected hearing aid glasses frame from a set of hearing aid glasses frames;

b) providing said selected hearing aid glasses frame with lenses in accordance with a prescription relating to client's eyes deviations;
c) paying by the client of a fee that is substantially less than a total sales price of said hearing aid glasses;
d) after a trial period, checking whether the client is satisfied with the hearing aid glasses as bought, and:
   I. if so, debiting the total sales price less the fee to said client;
   II. if not, allowing the client to keep the glasses and disabling the hearing functionality of said hearing aid glasses or exchanging the temples that contain the electronics for normal temples, without returning said fee.

By using this method, potential clients are helped in deciding to try hearing aid glasses, which may cost a substantial amount of money. Clients only have to pay a fee during the trial period and are sure that they need not pay more should they be not satisfied with the hearing aid glasses due to whatever reason. They will only have to pay the full amount of the sales price of the hearing aid glasses when they decide to keep the functionality of the hearing aid.

The fee may be below 20% of the total sales price.

The advantage for the user is that, through the payment of the fee, he/she will at least receive a pair of nice looking glasses with lenses in accordance with his/her eyes' prescriptions.

The advantage for the manufacturer is that by receiving the fee the costs for producing prescription glasses for a user's trial period are covered.

The invention claimed is:

1. Connector assembly for connecting an earpiece (27) of a hearing aid to a glasses temple (13), the glasses temple (13) comprising hearing aid components, the connector assembly (31) comprising a first connector housing (34; 34') and a second connector housing (37; 37'), the first connector housing (34; 34') being designed to be attached to said earpiece (27) via an intermediate unit (29), the second connector housing (37; 37') being designed either to be attached to, or to be part of said glasses temple (13), the first and second connector housings (34, 37; 34', 37') being designed to engage one another by means of a disconnectable connection, wherein said second connector housing (37; 37') comprises a first contact member (35; 35') and a second contact member (36; 36'), said first connector housing (34; 34') comprises a third contact member (30; 30') and a fourth contact member (32; 32'), said first contact member (35; 35') and said third contact member (30; 30') being arranged to contact one another by magnetic force and to allow an electrical current to flow between said first and third contact member, said second contact member (36; 36') and said fourth contact member (32; 32') being arranged to contact one another by magnetic force and to allow an electrical current to flow between said second and fourth contact member.

2. Connector assembly according to claim 1, wherein at least one of said first and third contact member comprises a first magnetic component to provide a first magnetic contact force and a first metal component covering at least a portion of said first magnetic component.

3. Connector assembly according to claim 2, wherein at least one of said second and fourth contact member comprises a second magnetic component to provide a second magnetic contact force and a second metal component covering at least a portion of said second magnetic component.

4. Connector assembly according to claim 3, wherein said first contact member (35; 35') comprises a first metal member (39; 39'), said second contact member (36; 36') comprises a second metal member (38; 38'), said third contact member (30; 30') comprises a third metal member (52; 52'), said fourth contact member (32; 32') comprises a fourth metal member (54; 54'), said first magnetic component being a permanent magnet (43; 48) forming part of at least one of said first and third contact member.

5. Connector assembly according to claim 4, wherein said first metal member is a first metal plate (39), said second metal member is a second metal plate (38), said third metal member is a third metal plate (52), and said fourth metal member is a fourth metal plate (54), said first metal plate (39) having a first contact surface to contact a third contact surface of said third metal plate (52), said second metal plate (38) having a second contact surface to contact a fourth contact surface of said fourth metal plate (54).

6. Connector assembly according to claim 2, wherein said first contact member (35; 35') comprises a first metal member (39; 39'), said second contact member (36; 36') comprises a second metal member (38; 38'), said third contact member (30; 30') comprises a third metal member (52; 52'), said fourth contact member (32; 32') comprises a fourth metal member (54; 54'), said first magnetic component being a permanent magnet (43; 48) forming part of at least one of said first and third contact member, and said second magnetic component being a further permanent magnet (41; 50) forming part of at least one of said second and fourth contact member.

7. Connector assembly according to claim 6, wherein said first metal member is a first metal box (39') accommodating a first permanent magnet (43), said second metal member is a second metal box (38') accommodating a second permanent magnet (41), said third metal member is a third metal box (52') accommodating a third permanent magnet (48), and said fourth metal member is a fourth metal box (54') accommodating a fourth permanent magnet (50).

8. Connector assembly according to claim 7, wherein said first metal box (39') has a first cavity accommodating said first permanent magnet (43), said second metal box (38') has a second cavity accommodating said second permanent magnet (41), said third metal box (52') has a third cavity accommodating said third permanent magnet (48), said fourth metal box (54') has a fourth cavity accommodating said fourth permanent magnet (50), said first metal box (39') being arranged to cover said first permanent magnet (43) completely apart from one side in use facing said third permanent magnet (48), said second metal box (38') being arranged to cover said second permanent magnet (41) completely apart from one side in use facing said fourth permanent magnet (50), said third metal box (52') being arranged to cover said third permanent magnet (48) completely apart from one side in use facing said first permanent magnet (43), said fourth metal box (54') being arranged to cover said fourth permanent magnet (50) completely apart from one side in use facing said second permanent magnet (41).

9. Connector assembly according to claim 6, wherein said permanent magnet (43; 48) comprises a metal coating forming a metal member, and said further permanent magnet (41; 50) comprises a further metal coating forming a further metal member.

10. Connector according to claim 9, wherein said metal coating comprises gold, and said further metal coating comprises gold.

11. Connector according to claim 1, wherein said first contact member (35; 35') and said third contact member (30; 30') are arranged to comprise at least one permanent magnet with an electrically conductive wire connected to it, and said second contact member (36; 36') and said fourth contact member (32; 32') are arranged to comprise at least one further permanent magnet with a further electrically conductive wire connected to it.

12. Connector assembly according to claim 1, wherein said third and fourth contact members (30, 32; 30', 32') are attached to wires (64, 66) extending in said intermediate unit (29) for transporting input signals to a speaker in said earpiece (27).

13. Connector assembly according to claim 1, wherein said third and fourth contact members (30, 32; 30', 32') are connected to a speaker (33) within said first connector housing (34; 34'), said speaker (33) being arranged to produce sound to be transported to said earpiece via said intermediate unit (29).

14. Connector assembly according to claim 13, wherein said speaker (33) is resiliently connected to said first connector housing (34') by means of two resilient sleeves (68, 82) at opposite sides of said speaker (33).

15. Connector assembly according to claim 1, wherein said third and fourth contact members (30, 32; 30', 32') within said first connector housing (34') are connected to a printed circuit board (56).

16. Connector assembly according to claim 1, wherein said intermediate unit (29) is made of a material that can be custom formed.

17. Hearing aid arrangement comprising a first connector housing (34; 34') that can be engaged via a disconnectable connection with a second connector housing (37; 37') which is arranged on a glasses temple (13), the hearing aid arrangement also comprising an intermediate unit (29) having one end attached to the first connector housing (34; 34') and an earpiece (27) that is connected to an other end of the intermediate unit (29), wherein the first connector housing (34; 34') comprises a third contact member (30; 30') designed to contact a first contact member (35; 35') in the second connector housing (37; 37') by magnetic force and to allow an electrical current to flow between said first and third contact member, and the first connector housing (34; 34') comprises a fourth contact member (32; 32') designed to contact a second contact member (36; 36') in the second connector housing (37; 37') by magnetic force and to allow an electrical current to flow between said second and fourth contact member.

18. Glasses temple of a pair of glasses, comprising hearing aid components, the glasses temple comprising a second connector housing (37; 37') arranged to be attached to a first connector housing (34; 34') of a hearing aid arrangement according to claim 17, wherein the second connector housing (37; 37') comprises a first contact member (35; 35') designed to contact a third contact member (30; 30') in the first connector housing (34; 34') by magnetic force and to allow an electrical current to flow between said first and third contact member, and the second connector housing (37; 37') comprises a second contact member (36; 36') designed to contact a fourth contact member (32; 32') in the first connector housing (34; 34') by magnetic force and to allow an electrical current to flow between said second and fourth contact member.

19. Glasses temple according to claim 18, wherein said temple is arranged to accommodate a rechargeable battery (70), comprises contact pads (26, 28; 26', 28') arranged to contact said rechargeable battery (70) to supply said rechargeable battery (70) with recharge power, and separate recharge contacts accommodated in said second connector housing (37; 37') connected to said contact pads (26, 28; 26', 28') and arranged to receive said recharge power from an external recharger.

20. Glasses temple according to claim 18, wherein said glasses temple (13) comprises a hole accommodating said second connector housing such that said second connector housing (37') lies below a surface of said glasses temple (13).

21. Hearing aid glasses with a glasses temple according to claim 20.

22. Hearing aid assembly comprising hearing aid glasses according to claim 21, wherein the hearing aid comprises a first connector housing (34; 34') that can be engaged via a disconnectable connection with a second connector housing (37; 37') which is arranged on a glasses temple (13), the hearing aid arrangement also comprising an intermediate unit (29) having one end attached to the first connector housing (34; 34') and an earpiece (27) that is connected to an other end of the intermediate unit (29), wherein the first connector housing (34; 34') comprises a third contact member (30; 30') designed to contact a first contact member (35; 35') in the second connector housing (37; 37') by magnetic force and to allow an electrical current to flow between said first and third contact member, and the first connector housing (34; 34') comprises a fourth contact member (32; 32') designed to contact a second contact member (36; 36') in the second connector housing (37; 37') by magnetic force and to allow an electrical current to flow between said second and fourth contact member.

23. A connector housing (34') designed to be attached to an earpiece (27) via an intermediate unit (29) and to engage a further connector housing (37'), the connector housing (34') accommodating a speaker (33) that is arranged to produce sound to be transported to said earpiece (27) via said intermediate unit (29), wherein said speaker (33) is resiliently connected to said first connector housing (34') by means of two resilient sleeves (68, 82) at opposite sides of said speaker (33).

* * * * *